United States Patent [19]
Shimura

[11] Patent Number: 5,875,065
[45] Date of Patent: *Feb. 23, 1999

[54] INFORMATION RECORDING REPRODUCING APPARATUS USING PILOT SIGNALS TO CORRECT TRACKING ERROR

[75] Inventor: Yukio Shimura, Yokohama, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 711,558

[22] Filed: Aug. 10, 1996

Related U.S. Application Data

[63] Continuation of Ser. No. 250,683, May 26, 1994, abandoned.

[30] Foreign Application Priority Data

May 28, 1993 [JP] Japan .................................. 5-151435

[51] Int. Cl.⁶ ................................................ G11B 5/584
[52] U.S. Cl. .................................... 360/77.14; 360/78.02; 360/77.15
[58] Field of Search ........................... 360/77.14, 77.15, 360/77.13, 70, 78.02

[56] References Cited

U.S. PATENT DOCUMENTS

| | | | |
|---|---|---|---|
| 4,303,953 | 12/1981 | Sanderson | 360/78.02 |
| 5,003,414 | 3/1991 | Yokozawa | 360/77.14 |
| 5,026,509 | 6/1991 | Arai | 360/77.14 |
| 5,081,550 | 1/1992 | Yagisawa et al. | 360/78.02 |
| 5,084,786 | 1/1992 | Konno et al. | 360/77.14 |
| 5,313,338 | 5/1994 | Ichikawa et al. | 360/13 |
| 5,315,457 | 5/1994 | Ono et al. | 360/77.14 |
| 5,317,457 | 5/1994 | Matsumi et al. | 360/77.14 |
| 5,398,140 | 3/1995 | Rhodu et al. | 360/77.14 |
| 5,402,281 | 3/1995 | Yanagihara et al. | 360/77.14 |
| 5,432,655 | 7/1995 | Nakamura et al. | 360/77.15 X |
| 5,546,248 | 8/1996 | Sakakibara et al. | 360/77.14 |

FOREIGN PATENT DOCUMENTS

| | | |
|---|---|---|
| 0138210 | 4/1985 | European Pat. Off. . |
| 0219303 | 4/1987 | European Pat. Off. . |
| 0266174 | 5/1988 | European Pat. Off. . |
| 0339724 | 11/1989 | European Pat. Off. . |
| 0343726 | 11/1989 | European Pat. Off. . |
| 380284AI | 1/1990 | European Pat. Off. . |
| 0359019 | 3/1990 | European Pat. Off. . |
| 0380284 | 8/1990 | European Pat. Off. . |
| 0436114 | 7/1991 | European Pat. Off. . |
| 0472375 | 2/1992 | European Pat. Off. . |
| 0476767 | 3/1992 | European Pat. Off. . |
| 2258363 | 2/1993 | United Kingdom . |

*Primary Examiner*—Nabil Hindi
*Attorney, Agent, or Firm*—Fitzpatrick, Cella, Harper & Scinto

[57] ABSTRACT

A plurality of different pilot signal components are selectively superposed on an information signal, and mark signals which can indicate the types of pilot signals to be superposed are recorded, together with the information signal, on tracks on a recording medium, on which the pilot signals associated with the mark signals are recorded. The types of pilot signals can be quickly detected in a reproduction mode, and a satisfactory tracking control state is quickly achieved by modifying the tracking control signal.

8 Claims, 19 Drawing Sheets

INFORMATION RECORDING REPRODUCING APPARATUS USING PILOT SIGNALS TO CORRECT TRACKING ERROR

This application is a continuation of application Ser. No. 08/250,683 filed May 26, 1994, now abandoned.

BACKGROUND OF THE INVENTION

1. Field of the Invention

The present invention relates to an information signal recording apparatus and information signal reproduction apparatus, which record or reproduce information on or from a large number of parallel tracks on a recording medium and, more particularly, to tracking control thereof. For example, the present invention relates to tracking control used in an apparatus such as a VTR for reproducing a video signal from oblique tracks recorded and formed on a magnetic tape by a rotary head.

2. Related Background Art

As conventional reproduction tracking methods for home VTRs, the following two methods have been proposed and put into practical applications. That is, one method is a method (CTL method) of recording a vertical sync signal separated from a recording signal upon recording on a special-purpose control track formed along the longitudinal direction of a tape using a stationary magnetic head provided adjacent a portion of a tape path. The other method is a method (4fATF method) of obtaining a tracking error signal by comparing crosstalk components reproduced from two neighboring tracks of a reproduction track upon reproduction by cyclically recording pilot signals having four different relatively low frequencies to be superposed on main signals such as a video signal, an audio signal, and the like on a track for recording the main signals using a rotary head for recording/reproducing the main signals.

However, the CTL method requires a space for the stationary head, and is disadvantageous in consideration of downsizing of a set. On the other hand, the 4fATF method is advantageous for downsizing, but requires a relatively complex circuit arrangement since a large number of analog circuits are required for four different pilot signals. In addition, in the 4fATF method, when the pilot signals are superposed on a digital signal, since these signals occupy a relatively broad frequency band, reliability of the digital signal is undesirably impaired.

On the other hand, in order to record/reproduce a relatively large information amount to meet requirements for high-image quality VTRs and digital VTRs in recent home VTRs, a VTR which divisionally records an image signal for one field on a plurality of tracks has been developed, and a new tracking method used in these VTRs has been examined. More specifically, upon modulation of a digital signal to be recorded, a recording signal is recorded, so that a modulated signal includes a frequency component corresponding to a specific pilot signal, and with this modulation, the pilot signal for tracking control is multiplexed on a digital information signal.

FIG. 1A is a schematic plan view of a drum for a VTR. A rotary drum 40 contacts a tape 41, and has a ch1 head 42 of a (+) azimuth, a ch2 head 43 of a (−) azimuth, a ch3 head 44 of a (+) azimuth, and a ch4 head 45 of a (−) azimuth.

FIG. 1B is a front view of the heads which can be observed upon rotation of the drum for explaining the mounting heights of the heads 42 to 45. The ch1 and ch2 heads and the ch3 and ch4 heads are respectively paired, and are arranged adjacent to each other. These pairs of heads are arranged on the drum 40 to have a 180° angular interval therebetween. As can be seen from FIG. 1B, the ch2 and ch4 heads are respectively offset from the ch1 and ch3 heads by a distance h, and the distance h corresponds to one track pitch on the tape. With this arrangement, two tracks can be simultaneously subjected to recording or reproduction for every half revolution of the drum, thus allowing recording/reproduction of a large amount of information.

A new tracking method will be described below. FIG. 2 is a view showing a recording pattern on the tape 41. Two different pilot signals having frequencies f1 and f2 are used for obtaining a tracking error signal, and are recorded on every other tracks to be superposed on main signals. The generation rotation of the pilot signals requires four tracks to complete one cycle. On a track corresponding to a (+) azimuth of the head, no pilot signal is superposed; on a track corresponding to a (−) azimuth of the head, the pilot signals of the frequencies f1 and f2 are alternately recorded. (1) to (10) in FIG. 2 represent intra-frame numbers of tracks since a signal for one frame is divisionally recorded on 10 tracks.

As described above, in this method, since four tracks are subjected to recording or reproduction during one revolution of the drum, scanning of tracks for one frame requires 2.5 revolutions, and the pilot rotation and frames are synchronized with each other in units of two frames (20 tracks).

FIG. 3 is timing charts showing pilot signals recorded by the heads (ch1 to ch4) to be superposed on main signals, and pilot signals reproduced by the heads upon reproduction. The following explanation will be given with reference to FIG. 3.

FIG. 3, (a) shows a frame signal upon recording or reproduction, FIG. 3, (b) shows a head SW (switch) signal for switching the heads, and FIG. 3, (c) shows the pilot timings of the ch1 and ch3 heads upon recording, at which no pilot signals are superposed. FIG. 3, (d) shows the pilot timings to be recorded by the ch2 and ch4 heads, at which the pilot signals of the frequencies f1 and f2 are alternately recorded. FIG. 3, (e) shows the pilot signals reproduced by the ch1 and ch3 heads in a good reproduction tracking state, and FIG. 3, (f) similarly shows the reproduction timings of pilot components reproduced by the ch2 and ch4 heads.

As can be seen from FIG. 2, in this method, when a head width w of each head is set to be wider than the track pitch, the pilot signals recorded on two neighboring tracks can be reproduced as crosstalk components at the reproduction timings of the ch1 and ch3 heads, and by utilizing the fact that the two crosstalk component amounts become equal to each other in a good tracking state, a tracking error signal (ATF error signal) is obtained.

FIG. 4 is a block diagram showing the circuit arrangement for detecting the ATF error signal upon reproduction.

Referring to FIG. 4, a head SW signal (HSW) 70 is used for switching reproduction signals from the ch1 and ch3 heads in synchronism with the rotation of the drum. An SW circuit 79 switches reproduction signals from the ch1 and ch3 heads in response to the HSW 70. A band-pass filter (BPF) 71 extracts only the frequencies f1 and f2 as those of reproduction pilot signals from a reproduction RF signal, and an amplifier 72 amplifies reproduction pilot signals as the outputs from the BPF 71. A band-pass filter 73 (BPF) extracts only the frequency component f2 from the output from the amplifier 72, and a band-pass filter (BPF) 74 extracts only the frequency component f1 from the output from the amplifier 72. A detecting circuit 75 converts the frequency component f2 as the output from the BPF 73 into a DC level, and a detecting circuit 76 similarly converts the frequency component f1 into a DC level. A differential amplifier 77 receives the outputs from the two detecting circuits. The output from the differential amplifier 77 is supplied to an inverting circuit (amplifier)78. An SW circuit 80 selects one of the output from the differential amplifier 77 and the output from the inverting circuit 78 in response to the HSW 70. A video & audio system reproduced signal processing circuit 81 obtains a reproduction video signal and a reproduction audio signal by processing a reproduction RF signal.

The operation will be described below. As described above, in this system, reproduction pilot signals are included as crosstalk components from two neighboring tracks ((−) azimuth tracks) in reproduction signals from the (+) azimuth ch1 and ch3 heads. Therefore, reproduction signals from only the ch1 and ch3 heads of the four heads are necessary, and the reproduction pilot signals are converted into one system of reproduction signal by an SW circuit 79. Since this reproduction signal is also included in main signals, it is supplied to the video & audio system reproduced signal processing circuit 81, and is also supplied to the BPF 71 for extracting reproduction pilot signals as an ATF circuit. Thereafter, the crosstalk pilot components f1 and f2 are separated and detected, and are compared by the differential amplifier 77, thus obtaining one system of ATF error signal.

In order to cope with the positional switch of tracks corresponding to the frequencies f1 and f2 between the ch1 and ch3 heads, an ATF error signal is obtained by selecting the output from the inverting amplifier 78 by the SW circuit 80 in synchronism with the HSW 70 upon selection of the ch3 head.

The new tracking method has been described. The new tracking method will be referred to as a 2fATF method hereinafter, as needed.

However, the above-mentioned new tracking method poses the following problems. That is, as a first problem, since a tracking error signal is obtained based on only pilot signals reproduced by heads which trace every other tracks (the ch1 and ch3 heads in the above-mentioned method), the ch1 and ch3 heads can be set in a good tracking state. However, other heads (the ch2 and ch4 heads offset by one track pitch from the ch1 and ch3 heads) may often cause an off-track state in accordance with their mounting precision.

As a second problem, the servo characteristics of a tracking control loop change due to a variation in reproduction output level caused by a reproduction level difference between the two pilot signals (frequencies f1 and f2), the performance of a tape to be used, and a difference in characteristic of the heads. In addition, the flutter characteristics in every four-track section of a capstan are impaired. In the conventional 4fATF method, as a countermeasure against these problems, a circuit for performing auto-gain control (AGC) of reproduction pilot signals by detecting pilot levels reproduced from main reproduction tracks has been put into practical application. However, in the new tracking method, since no pilot signals are recorded on tracks mainly traced by the ch1 and ch3 heads for obtaining reproduction pilot signals, the same arrangement as in the 4fATF method cannot be realized.

As a third problem, when information recorded by one head is reproduced by another head which has the same azimuth as that of the former head but is mounted at a different position like in a case wherein information recorded on a track using the ch1 head is reproduced by the ch3 head and vice versa, i.e., when a two-track offset occurs in tracking control, a position where the state of the ATF error signal becomes the same as an on-tracking state (back lock position) is present, and the presence of the back lock position disturbs satisfactory tracking control. In other words, a long period of time is required until the back lock position returns to a normal lock position, and an image is disturbed during this interval.

Furthermore, as a fourth problem, in the new tracking method, the pilot section requires four tracks to complete one cycle. For example, when a signal for one frame is divisionally recorded on 10 tracks, the pilot section and the frame section coincide with each other in units of two frames (20 tracks). In addition, when pilot signals are discontinuous in a joint recording portion, tracking control and an image are disturbed. As described above, in order to smoothly perform joint recording operations, a long preparation time is required.

SUMMARY OF THE INVENTION

It is an object of the present invention to solve the above-mentioned problems.

It is another object of the present invention to provide an information signal recording apparatus which allows easy adjustment of a tracking control circuit upon reproduction when pilot signals are superposed on an information signal to be recorded.

In order to solve the above objects, according to one aspect of the present invention, there is provided an information signal recording apparatus comprising:

(a) superposing means for selectively superposing a plurality of different pilot signal components on an information signal; and (b) recording means for recording, together with the information signal, mark signals which can indicate types of pilot signals to be superposed by the superposing means on a track on a recording medium, on which the pilot signal associated with the mark signal is recorded.

It is still another object of the present invention to provide an information signal reproduction apparatus which allows quick adjustment of tracking control during, e.g., a transient section upon reproduction of an information signal which is recorded on a recording medium and on which pilot signals are multiplexed.

In order to solve the above object, according to another aspect of the present invention, there is provided an information signal reproduction apparatus for reproducing an information signal from a recording medium in which an information signal, a plurality of different pilot signals, and mark signals indicating types of pilot signals are recorded on a large number of parallel tracks, comprising:

(a) reproduction means for reproducing a signal by tracing the recording medium;

(b) forming means for forming a tracking error signal on the basis of the pilot signal component in the signal reproduced by the reproduction means; and (c) modify means for modifying the tracking error signal using the mark signal reproduced by the reproduction means.

It is still another object of the present invention to provide an information signal reproduction apparatus which can eliminate a tracking control variation among heads upon reproduction of an information signal which is recorded on a recording medium and on which pilot signals are multiplexed.

In order to solve the above object, according to still another aspect of the present invention, there is provided an information signal reproduction apparatus for reproducing an information signal from a recording medium in which a pilot signal component of at least one predetermined frequency is superposed on the information signal on every other ones of a large number of parallel tracks, comprising:

(a) head means for reproducing a signal by tracing the recording medium, the head means comprising first and second heads for respectively tracing two neighboring tracks;

(b) first forming means for forming a first tracking error signal in accordance with the pilot signal component in the signal reproduced by the first head;

(c) second forming means for forming a second tracking error signal in accordance with the pilot signal component in the signal reproduced by the second head; and (d) tracking control means for controlling the relative positions between the head means and the recording medium in accordance with the first and second tracking error signals.

The above and other objects and features of the present invention will become apparent from the following detailed description of the embodiments of the present invention taken in conjunction with the accompanying drawings.

DETAILED DESCRIPTION OF THE PREFERRED EMBODIMENTS

The preferred embodiments of the present invention will be described in detail hereinafter with reference to the accompanying drawings.

Figure 1A:
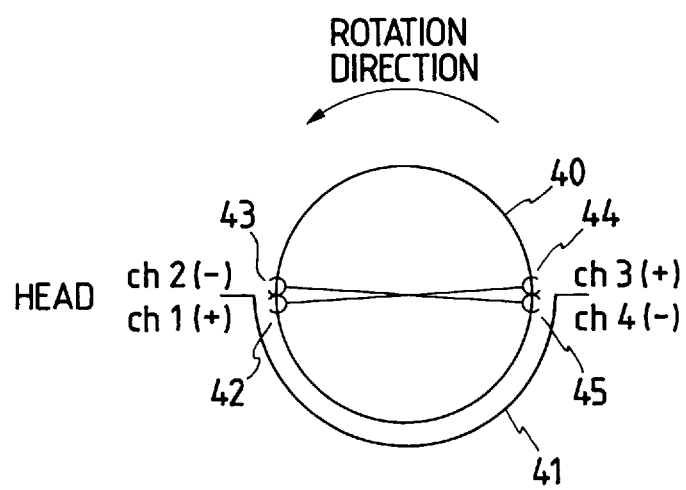
FIGS. 1A and 1B are respectively a plan view and a front view showing the arrangement of heads and a drum of a VTR which records two different pilot signals on every other track.
Figure 1B:
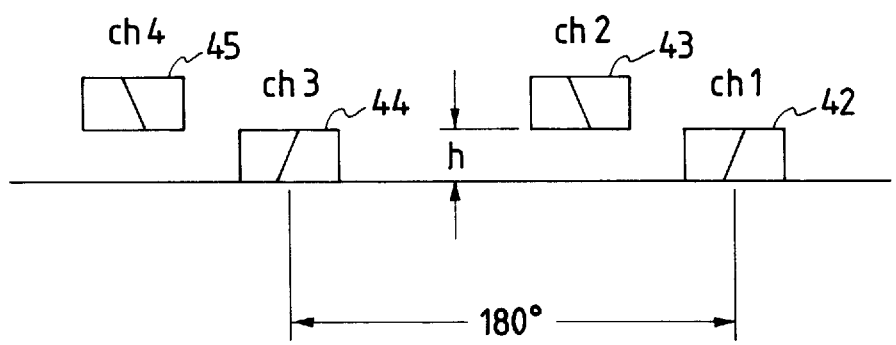
Figure 2:
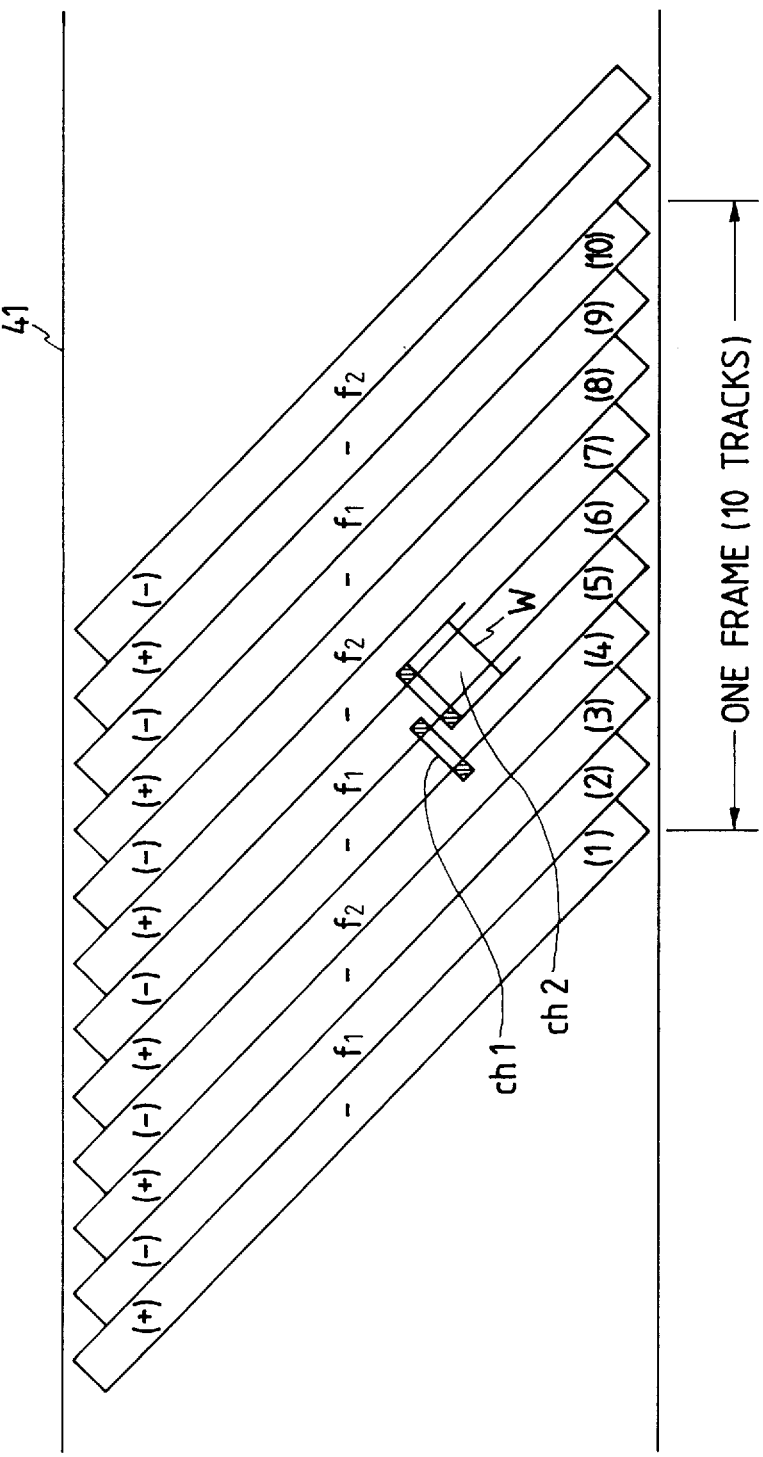
FIG. 2 is a view showing a recording pattern on a tape recorded by the heads shown in FIGS. 1A and 1B.
Figure 3:
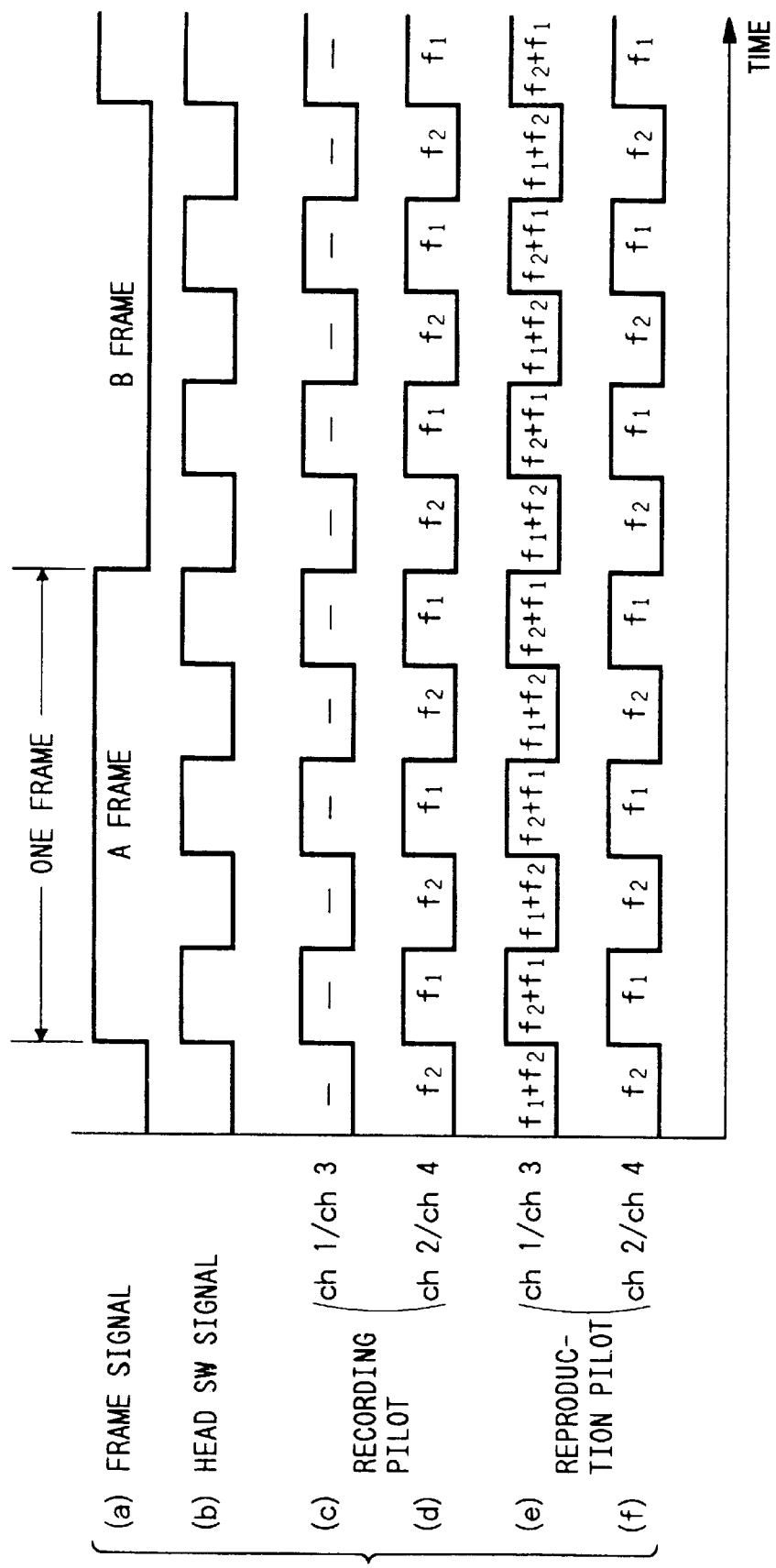
FIGS. 3(a)–3(f) comprise timing charts showing the supply timings of a recording signal for forming the recording pattern shown in FIG. 2.

Note that the head arrangement in each of embodiments to be described below is the same as that shown in FIGS. 1A and 1B.

Figure 5:
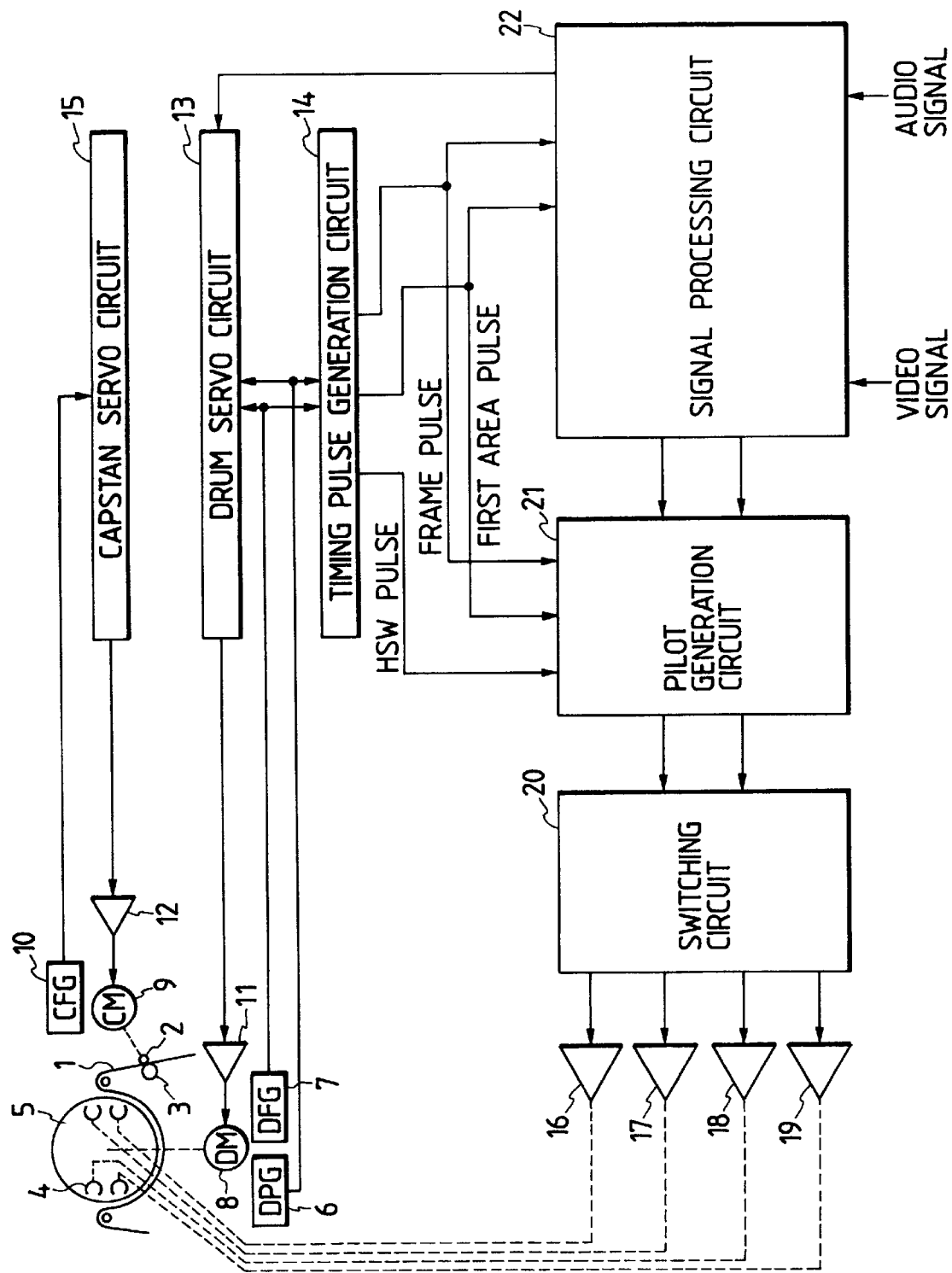
FIG. 5 is a schematic diagram showing the arrangement of the overall recording system of a VTR according to the first embodiment of the present invention.
Figure 6:
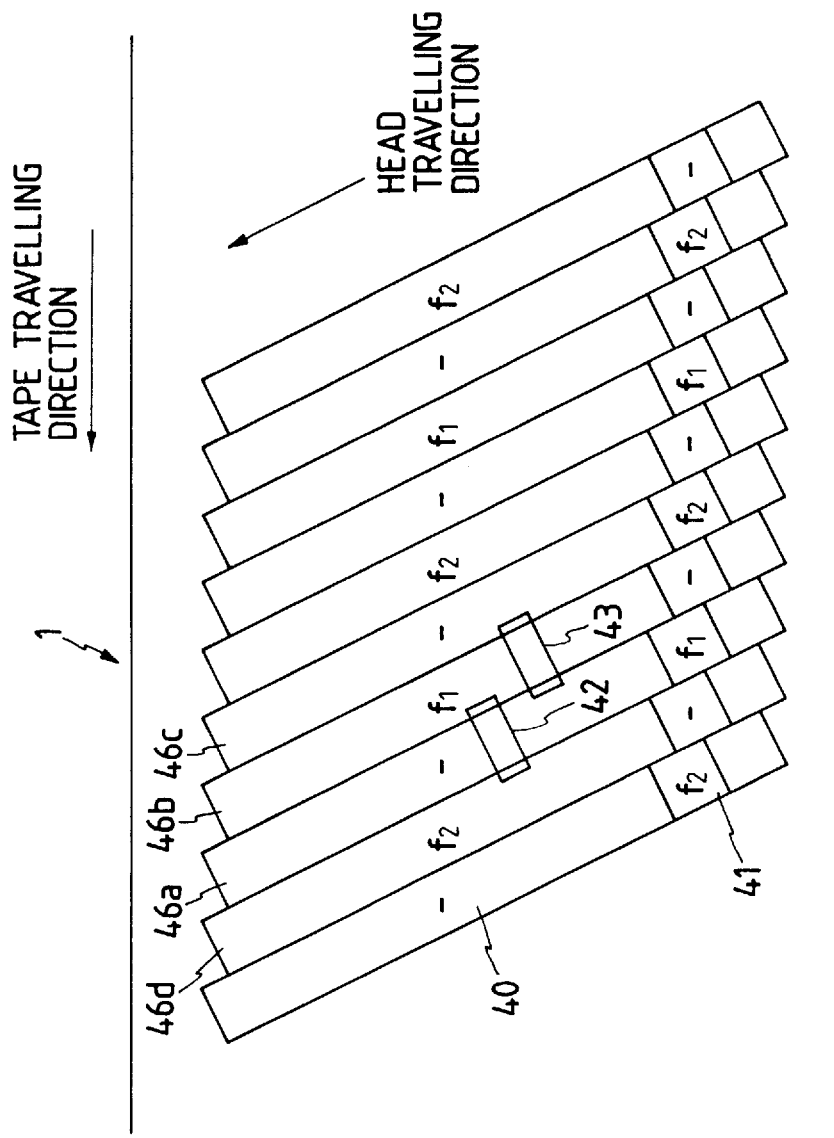
FIG. 6 is a view showing a recording pattern on a tape recorded by the recording system shown in FIG. 5.

FIGS. 5 and 6 are views for explaining a VTR according to the first embodiment of the present invention. FIG. 5 is a block diagram of a recording system, and FIG. 6 is a view showing a recording pattern of tracks on a tape.

The recording system shown in FIG. 5 includes a magnetic tape 1, a capstan 2, a pinch roller 3, and ch1 to ch4 heads 4. As shown in FIGS. 1A and 1B, heads 42 to 45 are arranged on a rotary drum 5. The recording system also includes a PG sensor 6 for detecting the rotation phase of the drum 5, an FG sensor 7 for detecting the rotation speed of a drum motor 8, a capstan motor 9 coupled to the capstan 2, an FG sensor 10 for detecting a rotation of the capstan motor 9, a driving circuit 11 for the drum motor 8, a driving circuit 12 for the capstan motor 9, a drum servo circuit 13 for controlling the drum motor 8, and a timing pulse generation circuit 14 for generating various timing pulses in synchronism with the rotation of the drum.

The recording system further includes a capstan servo circuit 15 for controlling the capstan motor 9, recording amplifiers 16 to 19 for the plurality of heads 4, a switching circuit 20, a pilot generation circuit 21 for generating pilot signals for obtaining a tracking signal upon reproduction, and a signal processing circuit 22 for converting externally input video and audio signals into digital signals, and executing predetermined processing such as compression, error correction, time-base processing, and the like.

Referring to FIG. 6, a pilot signal is recorded on a second area 40 by a normal operation. A pilot signal is recorded on a first area 41 by switching pilot signals. A track 46a is recorded by the ch1 head 42 of a (+) azimuth, a track 46b is recorded by the ch2 head 43 of a (−) azimuth, a track 46c is recorded by the ch3 head 44 (see FIG. 1A) of a (+) azimuth, and a track 46d is recorded by the ch4 head 45 (see FIG. 1A) of a (−) azimuth.

The operation of the recording system of the VTR according to this embodiment will be described below with reference to FIGS. 5, 6, and 7.

Pilot signals which are selected based on an HSW pulse, a frame pulse, and a first area pulse are superposed on two systems of video and audio signals which are converted into digital signals and are subjected to various kinds of signal processing in the signal processing circuit 22, and thereafter, the video and audio signals are recorded on the tape 1 to have a track pattern shown in FIG. 6.

Figure 7:
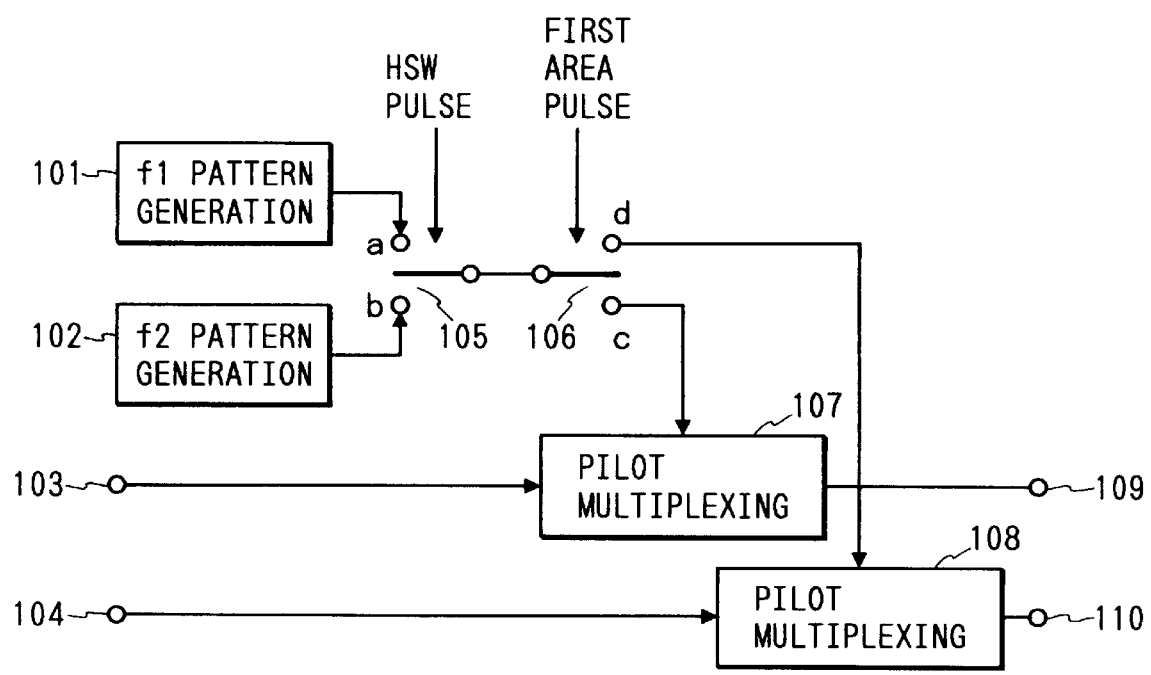
FIG. 7 is a block diagram showing the detailed arrangement of a pilot signal generation circuit shown in FIG. 5.

FIG. 7 is a block diagram showing the detailed arrangement of the pilot generation circuit 21 shown in FIG. 5. Referring to FIG. 7, f1 and f2 pattern generation circuits 101 and 102 respectively generate DC pattern signals of frequencies f1 and f2 (to be described later), and terminals 103 and 104 receive the two systems of digital signals output from the signal processing circuit 22.

A switch 105 is switched in response to the HSW pulse. The switch 105 is connected to the a side when the ch1 and ch2 heads 42 and 43 trace the surface of the tape, and is connected to the b side when the ch3 and ch4 heads 44 and 45 trace the surface of the tape.

A switch 106 is switched in response to the above-mentioned first area pulse. Only when the head traces the first area, the switch 106 is connected to the c side; during other sections, the switch 106 i connected to the d side. Digital signals input via the terminals 103 and 104 are input to pilot multiplexing circuits 107 and 108, so that frequency components corresponding to DC pattern signals output from the terminals c and d of the switch 6 are multiplexed on the digital signals.

The outputs from the pilot multiplexing circuits 107 and 108 are supplied to the switching circuit 20 via terminals 109 and 110, so that the output from the pilot multiplexing circuit 107 is supplied to the ch1 and ch3 heads 42 and 44, and the output from the pilot multiplexing circuit 108 is supplied to ch2 and ch4 heads 43 and 45.

In this manner, while the ch1 and ch2 heads trace the surface of the tape, a pilot signal f1 is multiplexed on digital signals. In this case, while the heads trace the first area, the pilot signal f1 is multiplexed on digital signals to be recorded by the ch1 head 42; during other sections, the pilot signal f1 is multiplexed on digital signals to be recorded by the ch2 head 43. While the ch3 and ch4 head trace the surface of the tape, a pilot signal f2 is multiplexed on digital signals. In this case, while the heads trace the first area, the pilot signal f2 is multiplexed on digital signals to be recorded by the ch3 head 44; during other sections, the pilot signal f2 is multiplexed on digital signals to be recorded by the ch4 head 45.

Figure 8:
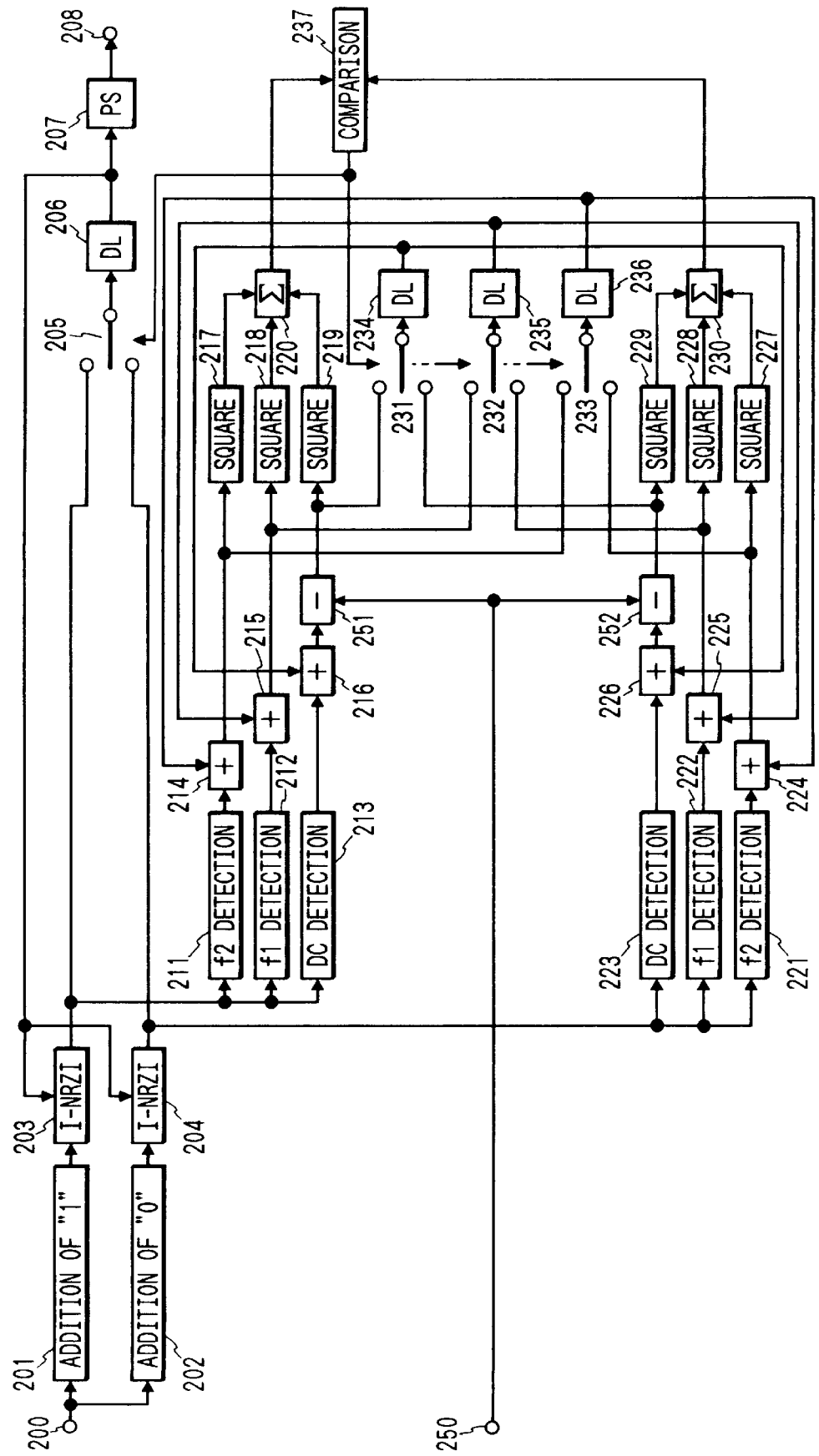
FIG. 8 is a block diagram showing the detailed arrangement of a pilot multiplexing circuit shown in FIG. 7.

The detailed arrangement of the pilot multiplexing circuits 107 and 108 in FIG. 7 will be described below with reference to FIG. 8. Assume that an input terminal 200 in FIG. 8 receives, e.g., a 24-bit digital signal from the signal processing circuit 22. An addition circuit 201 adds a control bit "1" to the head of the 24-bit signal, and supplies the sum data as 25-bit parallel data to an interleaved NRZI (I-NRZI) modulation circuit 203. The I-NRZI modulation circuit of this embodiment is a circuit for calculating EX-ORs between odd bits and between even bits, i.e., between every other odd and even bit. Note that other modulation methods may be applied to this embodiment as long as data is modulated so that some data bits in. each word have inverted relationships depending on a control bit "0" or "1". The I-NRZI modulation circuit 203 and an I-NRZI modulation circuit 204 convert 25-bit data respectively added with "1" and "0" into I-NRZI-modulated 25-bit data, and output the modulated data.

Detection circuits 211, 212, and 213 respectively detect f2, f1, and DC components included in 25-bit data output from the I-NRZI modulation circuit 203, and detection circuits 221, 222, and 223 respectively detect f2, f1, and DC components included in 25-bit data output from the I-NRZI modulation circuit 204. Each of the DC detection circuits 213 and 223 can detect a DC component by simply adding bits "1" as +1 and bits "0" as −1 of input digital data, i.e., by calculating a DSV. Each of the frequency components f1 and f2 can be detected by multiplying bit patterns corresponding to cosine and sine waves of the frequency component f1 or f2 to be detected with bits "1" as +1 and bits "0" as −1 of input digital data, and then adding the products.

The DC components detected by the DC detection circuits 213 and 223 are supplied to addition circuits 216 and 226. On the other hand, the outputs from the f1 detection circuits 212 and 222 are supplied to addition circuits 215 and 225, and the outputs from the f2 detection circuits 211 and 221 are supplied to addition circuits 214 and 224. Each of the addition circuits 214, 215, 216, 224, 225, and 226 is a circuit for accumulating corresponding previous components, and receives the previous frequency components corresponding to a finally selected data string at the other input terminal via a corresponding one of delay circuits 234, 235, and 236. As is apparent from the above description, the outputs from these addition circuits are equivalent to data obtained by Fourier-transforming a code string from an amplitude domain to a frequency domain.

DC patterns including frequency components corresponding to pilot signals to be recorded are subtracted from the outputs from the addition circuits 216 and 226 by subtracters 251 and 252, as will be described later, and the differences are supplied to square circuits 219 and 229. On the other hand, the outputs from the addition circuits 214, 215, 224, and 225 are respectively supplied to square circuits 217, 218, 227, and 228, and are converted into values proportional to the corresponding components. Furthermore, the outputs from the square circuits 217, 218, and 219 are supplied to an addition circuit 220, and a sum total of these outputs is calculated. Similarly, the outputs from the square circuits 227, 228, and 229 are supplied to an addition circuit 230, and a sum total of these outputs is calculated.

The outputs from these addition circuits 220 and 230 are supplied to a comparison circuit 237 to detect a smaller output, and control signals to be supplied to a switch 205 and switches 231, 232, and 233 are formed in accordance with the detection result. When the output from the addition circuit 220 is smaller than that output from the addition circuit 230, a modulation signal which is added with a control code "1" at its head position is selected by the switch 205; when the output from the addition circuit 230 is smaller than that output from the addition circuit 220, a modulation signal which is added with a control code "0" at its head position is selected by the switch 205. Also, the switches 231, 232, and 233 are controlled to output accumulated values of the previous frequency components corresponding to the selected modulation signal. With this control, the delay circuits (DLs) 234, 235, and 236 delay the accumulated values of the previous frequency components to the input timing of the next word, and feed back the delayed values to the above-mentioned addition circuits 214, 215, 216, 224, 225, and 226.

In this case, if no signal is output from a terminal 250, and DC components detected by the detection circuits 213 and 223 simply pass through subtracters 251 and 252, a modulation data string is selected to decrease the energy levels of the f1, f2, and DC components, and control is preformed so that notches are generated in DC, f1, and f2 frequency domains in a spectrum distribution of bit-stream data output from the switch 205.

On the other hand, if a DC component corresponding to the frequency f1 is output from the terminal 250, and is subtracted from the accumulated values of DC components of modulation data by the subtracters 251 and 252, control is preformed to decrease the energy level of data obtained by subtracting the DC pattern from the DC components. More specifically, the DC component is controlled to coincide with the DC pattern.

For example, the frequency of a 100-bit section in a bit stream is assumed to be the frequency f1. When the frequency f1 is to be recorded as a pilot signal, if a value which changes in every 4-word (4·25 bits) section is given as a DC pattern, a signal to be output becomes a data string which has many f1 components in its spectrum. For example, when 0, a, 0, −a (a is a predetermined integer) are sequentially added to accumulated values output from the addition circuits 216 and 226 in units of words, a data string which has many f1 components in its spectrum can be obtained. Also, for example, the frequency of a 50-bit section in a bit stream is assumed to be the frequency f2. When the frequency f2 is to be recorded as a pilot signal, if a value which changes in every 2-word (2·25 bits) section is given as a DC pattern, a signal to be output becomes a data string having many f2 components in its spectrum. For example, when b and −b (b is a predetermined integer) are alternately added to the accumulated values output from the addition circuits 216 and 226, a data string which has many f2 components in its spectrum can be obtained.

In this manner, when data output from the switch 205 is converted into a bit stream, digital data on which desired pilot signal components f1 and f2 are superposed can be obtained.

The output from the switch 205 is fed back to the above-mentioned I-NRZI circuits 203 and 204 via a delay circuit (DL) 206, and two bits from the LSB are utilized for modulating the next word. The output from the delay circuit 206 is converted into a bit stream by a parallel-serial (PS) converter 207, and is output from an output terminal 208.

Figure 9:
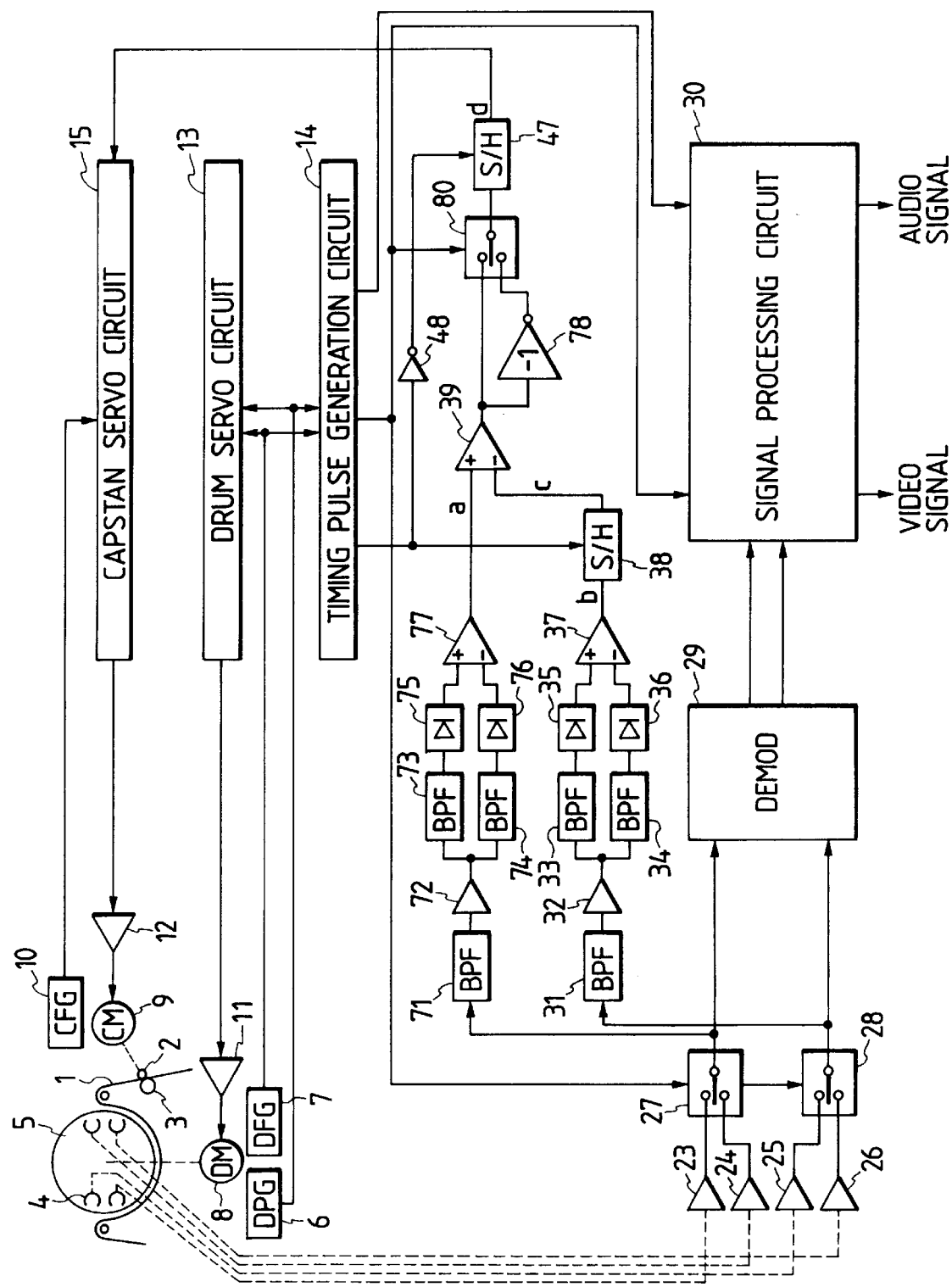
FIG. 9 is a block diagram showing the arrangement of a reproduction system of the VTR according to the first embodiment of the present invention.
Figure 10:
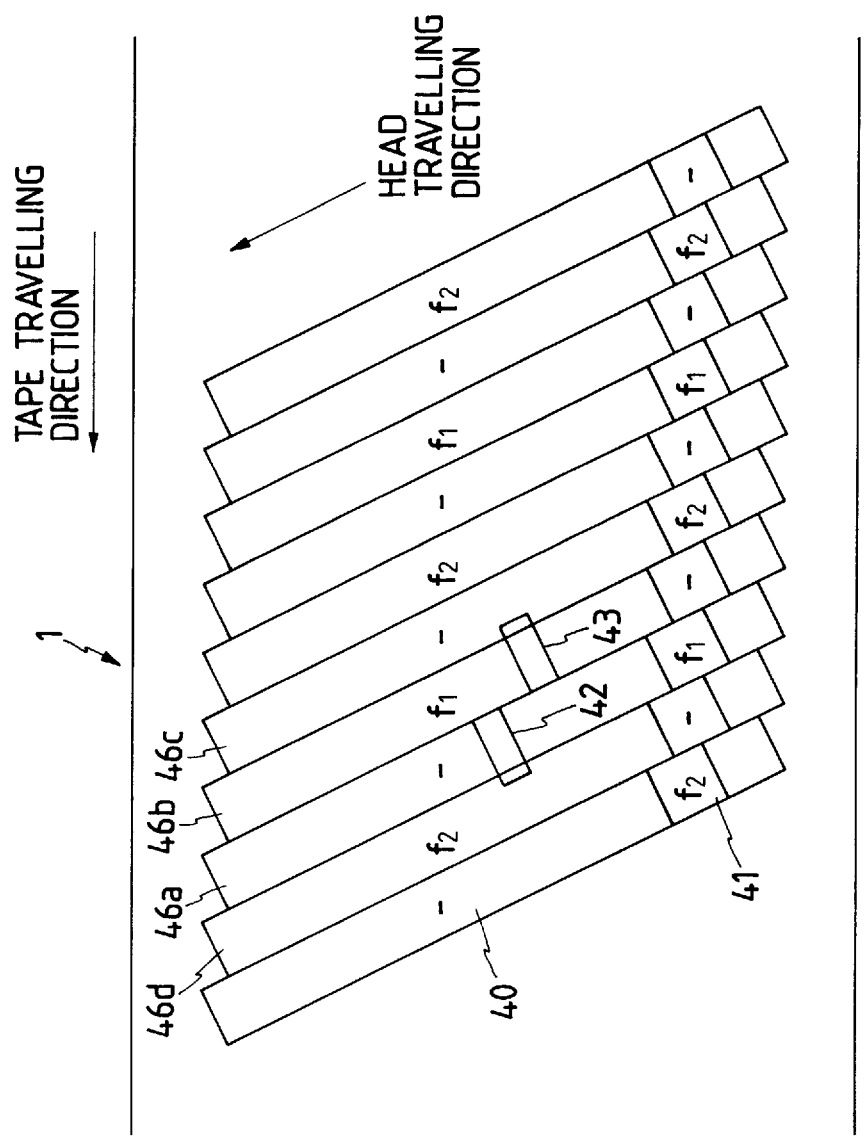
FIG. 10 is a view showing a tracking state of heads in the reproduction system shown in FIG. 9.
Figure 11:
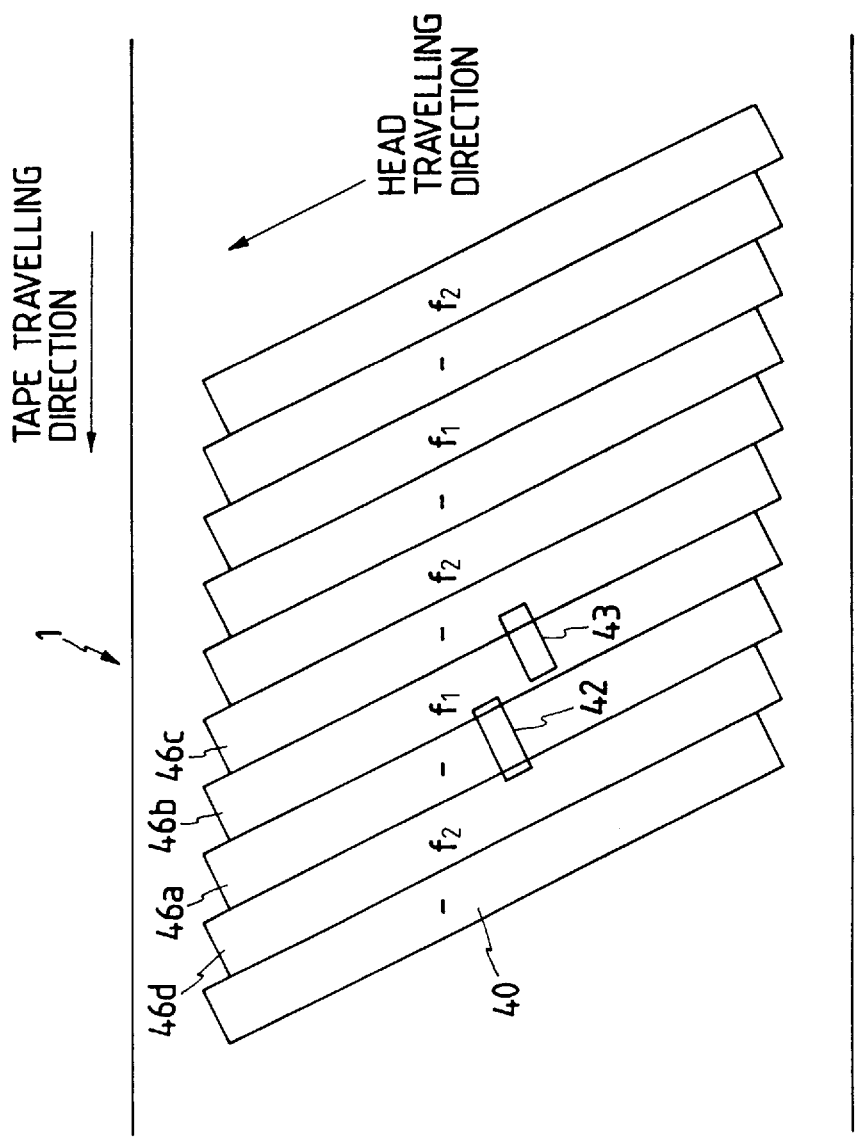
FIG. 11 is a view showing a head trace state when adjustment according to the first embodiment of the present invention is not performed.
Figure 12:
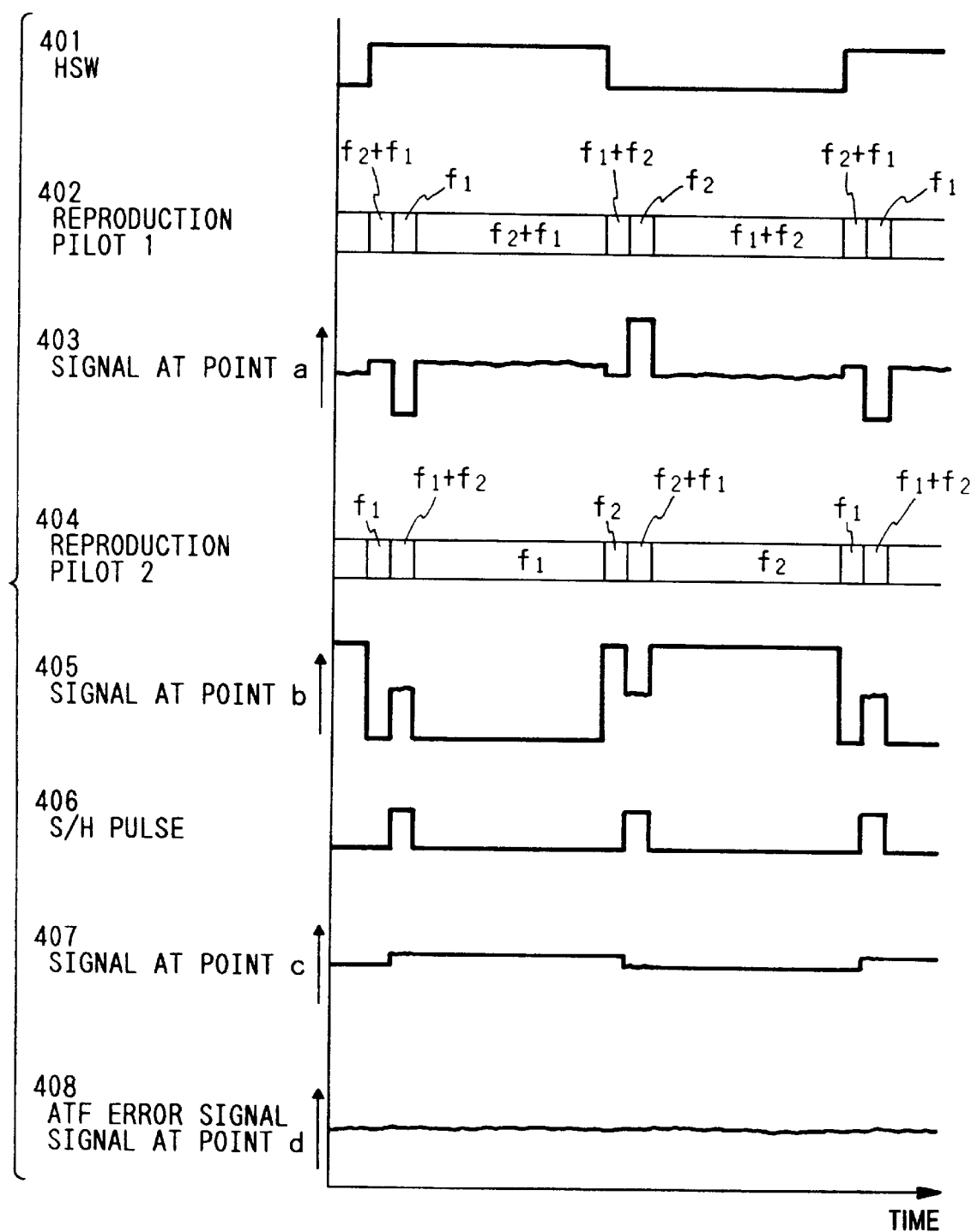
FIG. 12 is a timing chart showing reproduction signals obtained by executing tracking shown in FIG. 10 by the reproduction system shown in FIG. 9.

FIGS. 9 to 12 are views for explaining the reproduction system of the VTR of this embodiment. FIG. 9 is a block diagram showing the reproduction system, FIG. 10 shows a tracking state of the heads in this embodiment, FIG. 11 shows a head trace state obtained when adjustment of this embodiment is not performed, and FIG. 12 is a timing chart of signals obtained when the tracking of the heads is performed, as shown in FIG. 10.

Referring to FIGS. 10 and 11, components 40 to 43, 46a, and 46b correspond to those denoted by the same reference numerals in FIG. 6.

Referring to FIG. 9, components 1 to 15 correspond to those denoted by the same reference numerals in FIG. 5. The reproduction system includes reproduction amplifiers 23 to 26 for the plurality of heads 4, SW circuits 27 and 28 for selecting reproduction outputs, a demodulation circuit 29 for demodulating a recorded/modulated reproduction signal, and a signal processing circuit 30 for executing processing such as time-base processing, error correction, expansion, and the like, analog-converting the processed signal into original video and audio signals, and outputting the analog video and audio signals to an external circuit.

The reproduction system also includes a band-pass filter (BPF) 31 for extracting pilot signals from a reproduction signal selected by the SW circuit 28, an amplifier 32 for amplifying a reproduction pilot signal, a BPF 33 for extracting only f2 components from the reproduction pilot signal, a BPF 34 for extracting only f1 components from the reproduction pilot signal, a detecting circuit 35 for DC-converting f2 components, a detecting circuit 36 for DC-converting f1 components, a differential amplifier 37 for receiving two detected outputs, and an S/H circuit 38 for sampling and holding a differentially amplified output.

Figure 4:
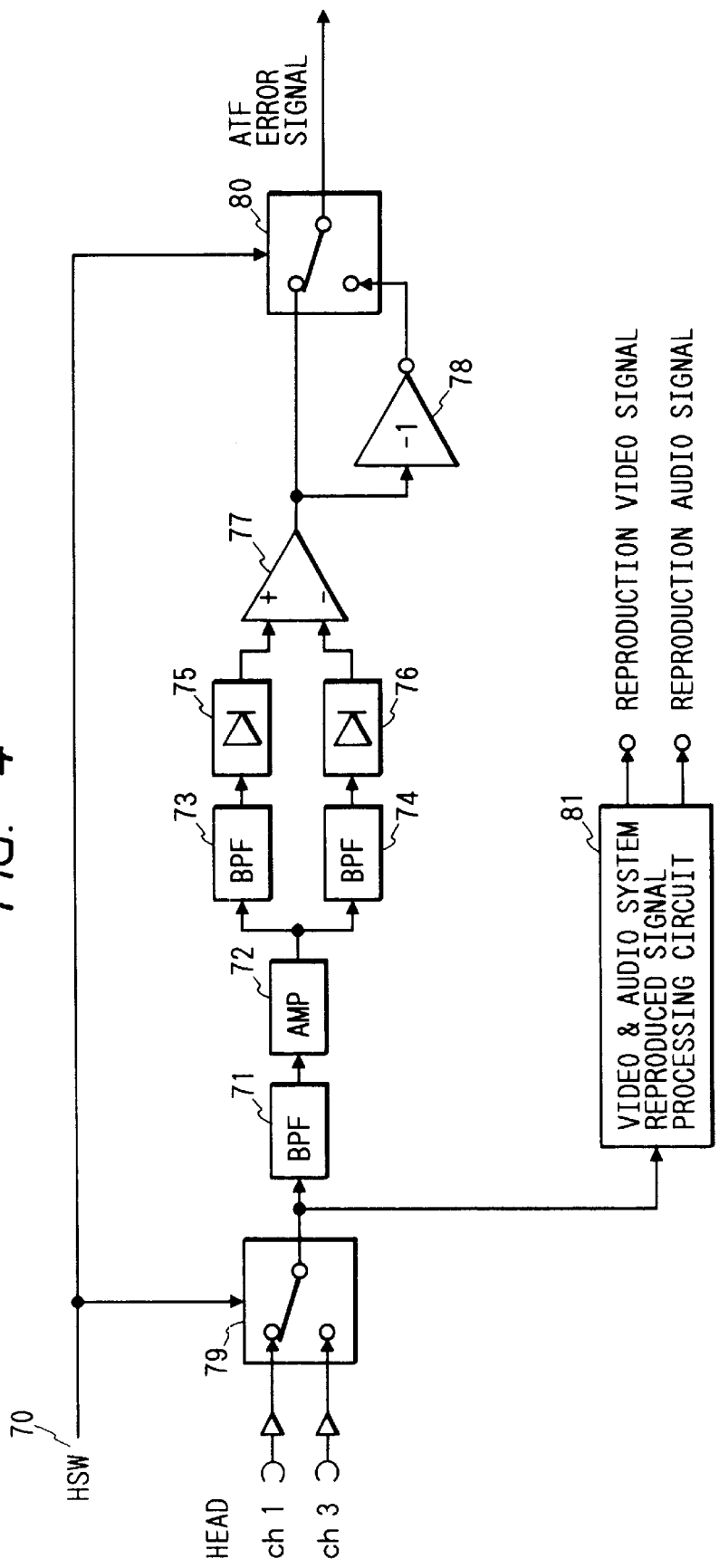
FIG. 4 is a block diagram showing the circuit arrangement for forming a tracking error signal upon reproduction of the recording pattern shown in FIG. 2.

The reproduction system further includes a differential amplifier 39 for receiving a differentially amplified output from a differential amplifier 77 and an S/H output from the S/H circuit 38, an S/H circuit 47 for sampling and holding an output signal from an SW circuit 80, and an inverter circuit 48. Components 71 to 78, and 80 are the same as those denoted by the same reference numerals in FIG. 4.

Referring to FIG. 12, a waveform 401 represents a head switching (HSW) pulse for selecting the reproduction heads in synchronism with the rotation of the drum, a waveform 402 represents a reproduction pilot 1 as pilot signals reproduced by the ch1 and ch3 heads, and a waveform 403 represents a tracking signal obtained by processing the pilot signals reproduced by the ch1 and ch3 heads at a point a in FIG. 9.

A waveform 404 represents a reproduction pilot 2 as pilot signals reproduced by the ch2 and ch4 heads, a waveform 405 represents a tracking signal obtained by processing the pilot signals reproduced by the ch2 and ch4 heads at a point b in FIG. 9, a waveform 406 represents S/H pulses for sampling and holding the tracking signal 405 of the ch2 and ch4 heads in the first area 41, a waveform 407 represents a signal obtained by sampling and holding the tracking signal 405 of the ch2 and ch4 heads in the first area 41 at a point c in FIG. 9, and a waveform 408 represents an ATF error signal at a point d in FIG. 9.

The ch1 and ch2 heads 42 and 43 in FIG. 6 simultaneously or alternately record information on the tracks 46a and 46b. When these heads travel on the first area 41, the pilot signals are switched between the pair of heads, and each of these heads records the other pilot signal. On the second area 40, the pilot signals are returned to normal ones, and the heads record the normal pilot signals. The pilot signal to be recorded by the ch1 head 42 is initially no pilot signal, f1 on the first area 41, and no pilot signal on the second area 42. On the other hand, the pilot signal to be recorded by the ch2 head 43 is initially f1, no pilot signal on the first area 41, and f1 on the second area 40. Thus, the pilot signal is recorded on the track of the ch1 head 42 as well.

Similarly, the ch3 and ch4 heads 44 and 45 simultaneously or alternately record information on the tracks 46c and 46d. The pilot signal to be recorded by the ch3 head 44 is initially no pilot signal, f2 on the first area 41, and no pilot signal on the second area 42. On the other hand, the pilot signal to be recorded by the ch4 head 45 is initially f2, no pilot signal on the first area 41, and f2 on the second area 40. Thus, the pilot signal is recorded on the track of the ch3 head 44 as well.

The operation of the reproduction system of the present invention will be described below with reference to FIG. 9.

Referring to FIG. 9, signals recorded on the tape 1, as shown in FIG. 6, are reproduced by the plurality of heads 4, and are amplified by the reproduction amplifiers 23 to 26, thus obtaining reproduction signals. The reproduction amplifier 23 reproduces a signal from the ch1 head, the reproduction amplifier 24 reproduces a signal from the ch3 head, the reproduction amplifier 25 reproduces a signal from the ch2 head, and the reproduction amplifier 26 reproduces a signal from the ch4 head.

One of the reproduction signals output from the ch1 and ch3 heads is selected by the SW circuit 27, and one of the reproduction signals output from the ch2 and ch4 heads is selected by the SW circuit 28. The two systems of selected reproduction signals are respectively distributed to an ATF system and a signal processing system. In the signal processing system, the demodulation circuit 29 demodulates the NRZI-modulated signal. The signal processing circuit 30 executes processing such as time-base processing, error correction, expansion, and the like, analog-converts the processed signal into original video and audio signals, and outputs the analog video and audio signals to an external circuit.

In the ATF system, the BPFs 31 and 71 extract pilot signal components. As described above, according to this embodiment, all the heads 4 obtain reproduction pilot signals from the main tracks, and all the heads 4 can obtain tracking signals. For this reason, stable tracking control can be realized.

The operation of the reproduction system according to this embodiment will be explained below with reference to FIGS. 9 to 12.

Referring to FIG. 9 described above, the reproduction pilot signal 402 from the ch1 or ch3 head in FIG. 12, which signal is extracted by the BPF 71, is amplified by the amplifier 72, and is output as the tracking signal 403 of the ch1 or ch3 head in FIG. 12 via the BPFs 73 and 74, the detecting circuits 75 and 76, and the differential amplifier 77.

Also, the reproduction pilot signal 404 from the ch2 or ch4 head in FIG. 12, which signal is extracted by the BPF 31, is amplified by the amplifier 32, and is output as the tracking signal 405 of the ch2 or ch4 head in FIG. 12 via the BPFs 33 and 34, the detecting circuits 35 and 36, and the differential amplifier 37.

Since the tracking signal 405 of the ch2 or ch4 head is effective on only the first area 41 in FIG. 10, this tracking signal is sampled in response to the S/H pulse 406 in FIG. 12 by the S/H circuit 38 on the first area 41, and is output as the previously held S/H signal 407 in FIG. 12 on the second area 40.

The differential amplifier 39 calculates the difference between the tracking signal 403 of the ch1 or ch3 head, and the sampled and held tracking signal 407 of the ch2 or ch4 head, thereby achieving a satisfactory tracking state for both the ch1 or ch3 head and the ch2 or ch4 head. Since the reproduction pilot signals from the pair of ch1 and ch2 heads and the pair of ch3 and ch4 heads have opposite polarities, a correspondence between these signals is established using the inverting amplifier 78 and the SW circuit 80. Since the tracking signal becomes discontinuous on the first area 41, a continuous tracking signal is obtained using the S/H circuit 47, and is output as the ATF error signal 408 in FIG. 12 to the capstan servo circuit 15, thus executing tracking control.

FIG. 10 shows a tracking state obtained upon execution of this embodiment. When the tracking signal of the ch2 or ch4 head on the first area 41 is added to the tracking signal of the ch1 or ch3 head on the second area 40, a satisfactory tracking state can be realized for both the ch1 or ch3 head and the ch2 or ch4 head even when the mounting precision (relative offset) of the heads is poor.

FIG. 11 shows a conventional tracking state. In this state, since tracking control is executed using only the ch1 or ch3 head, the ch2 or ch4 head causes an off-tracking state when the mounting precision (relative offset) is poor.

As described above, according to this embodiment, a satisfactory tracking state can be realized for all the heads.

Figure 13:
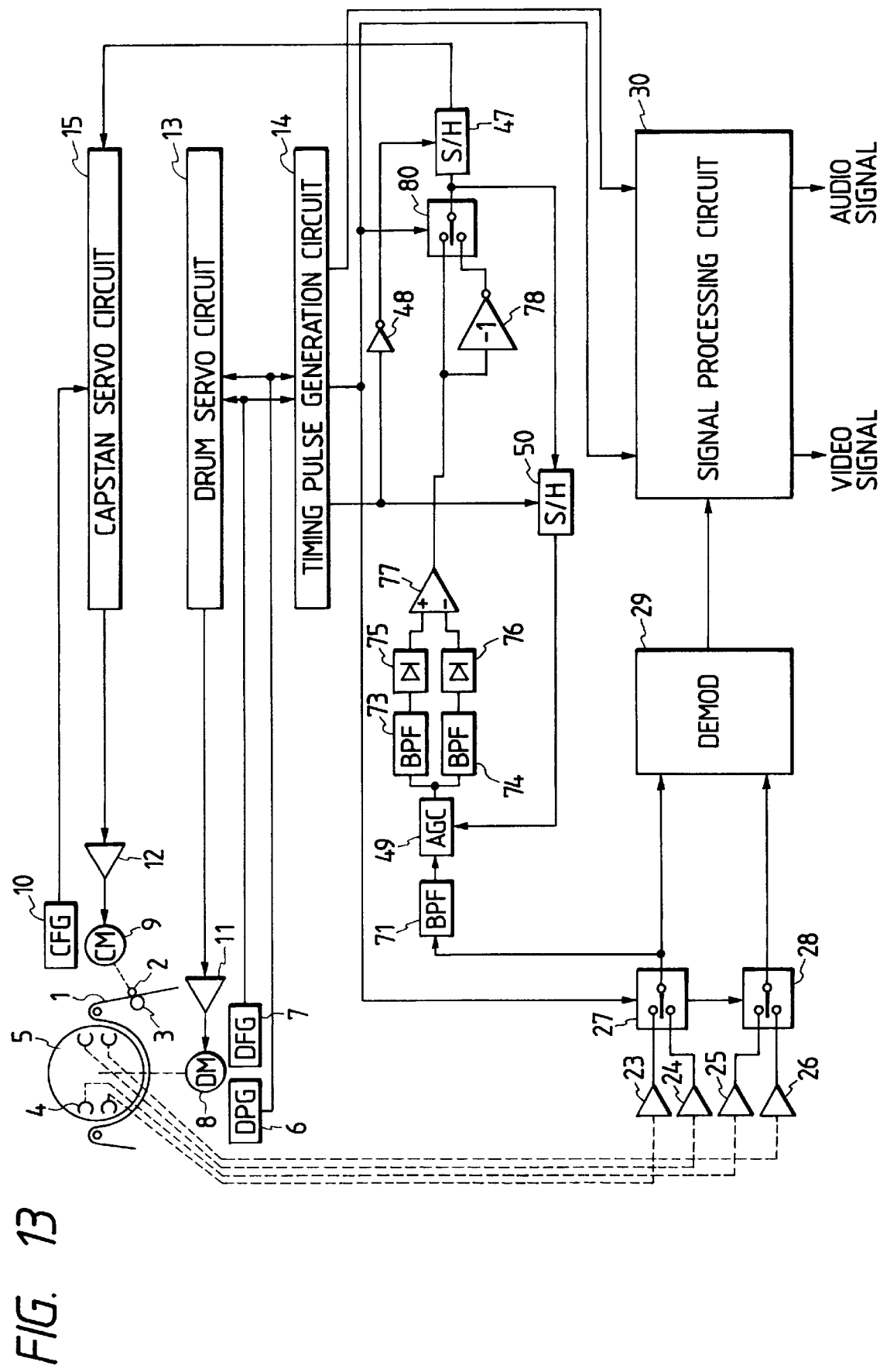
FIG. 13 is a block diagram showing the arrangement of a reproduction system of a VTR according to the second embodiment of the present invention.

FIG. 13 shows the arrangement of a reproduction system of a VTR according to the second embodiment of the present invention. In FIG. 13, components 1 to 15, 23 to 30, 71 to 78, and 80 are the same as those in FIG. 9.

Referring to FIG. 13, the reproduction system includes an AGC circuit 49 for correcting a variation in reproduction pilot level caused by a variation in characteristics of the tape 1, a variation in recording current, and the like, and an S/H circuit 50 for sampling and holding an output signal from the SW circuit 80.

The operation of the second embodiment will be described below.

While the heads trace the first area 41, the S/H circuit 50 samples the output from the SW circuit 80, and while the heads trace the second area 40, the S/H circuit 50 holds the output from the SW circuit 80, thereby detecting a pilot level reproduced from a mainly traced track on the first area 41. Then, the AGC circuit 49 performs gain control of the reproduction pilot signals.

As described above, according to the second embodiment, reproduction pilot signals with a good reproduction level can always be used in tracking control.

Figure 14:
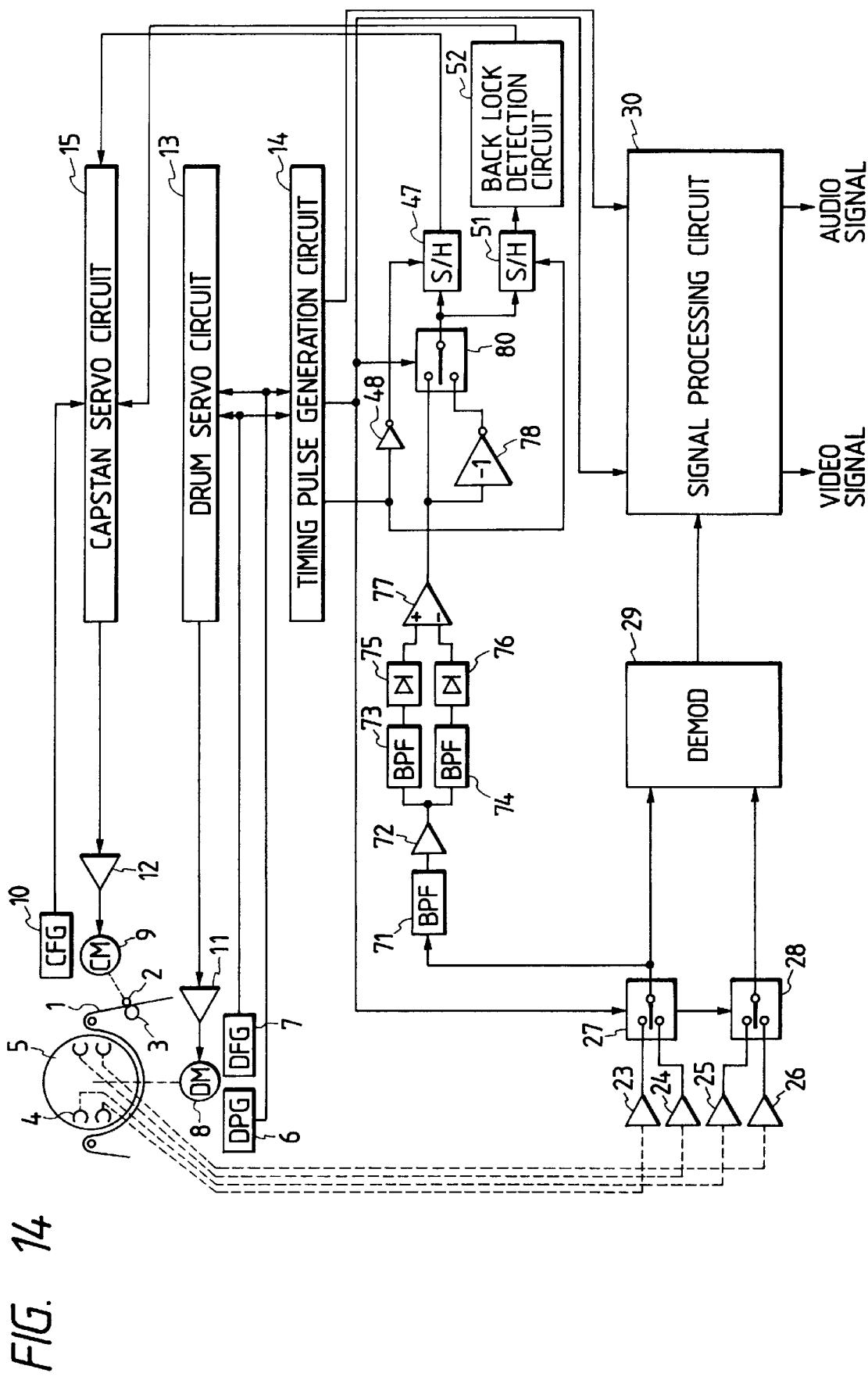
FIG. 14 is a block diagram showing the arrangement of a reproduction system of a VTR according to the third embodiment of the present invention.

FIG. 14 shows the arrangement of a reproduction system of a VTR according to the third embodiment of the present invention. In FIG. 14, components 1 to 15, 23 to 30, 47, 48, 71 to 78, and 80 are the same as those in FIGS. 9 and 13.

Referring to FIG. 14, the reproduction system includes an S/H circuit 51 for sampling and holding an output signal from the SW circuit 80, and a back lock detection circuit 52 for discriminating the type of pilot components on the basis of the output from the S/H circuit 51, and detecting a back lock position.

The operation of the third embodiment will be described below.

While the heads trace the first area 41, the S/H circuit 51 samples the output from the SW circuit 80, and while the heads trace the second area 40, the S/H circuit 51 holds the output from the SW circuit 80 and supplies it to the back lock detection circuit 52. Thus, the presence/absence of the back lock state is detected based on the pilot signals reproduced from the main track (mainly traced track) on the first area 41, and is output to the capstan servo circuit 15. In response to this output, the capstan servo circuit 15 operates to move the tape 1 by two tracks. The same effect can be obtained by inverting the switching phase of the SW circuit 80 in accordance with the output from the back lock detection circuit 52.

As described above, according to the third embodiment, tracking control for quickly recovering a back lock position to a normal lock position can be realized.

In each of the first to third embodiments described above, a four-head type VTR having two pairs of heads has been exemplified. However, the present invention is not limited to this. The above-mentioned principle can be similarly applied to a recording/reproduction apparatus which uses N pairs of heads, and adopts a tracking error detection method for superposing pilot signals on main signals in each M-track section (M is an integer equal to or larger than 2), and the same effect as described above can be obtained.

More specifically, independently of the head arrangement, the above-mentioned idea can be basically applied to a reproduction apparatus which obtains a tracking error signal from reproduction signals of heads which scan tracks on which no pilot signals are superposed by a pilot recording method for superposing pilot signals on main signals in each section of a predetermined number of tracks.

The S/H circuits in each of the first to third embodiments can be replaced by A/D converters.

Figure 15:
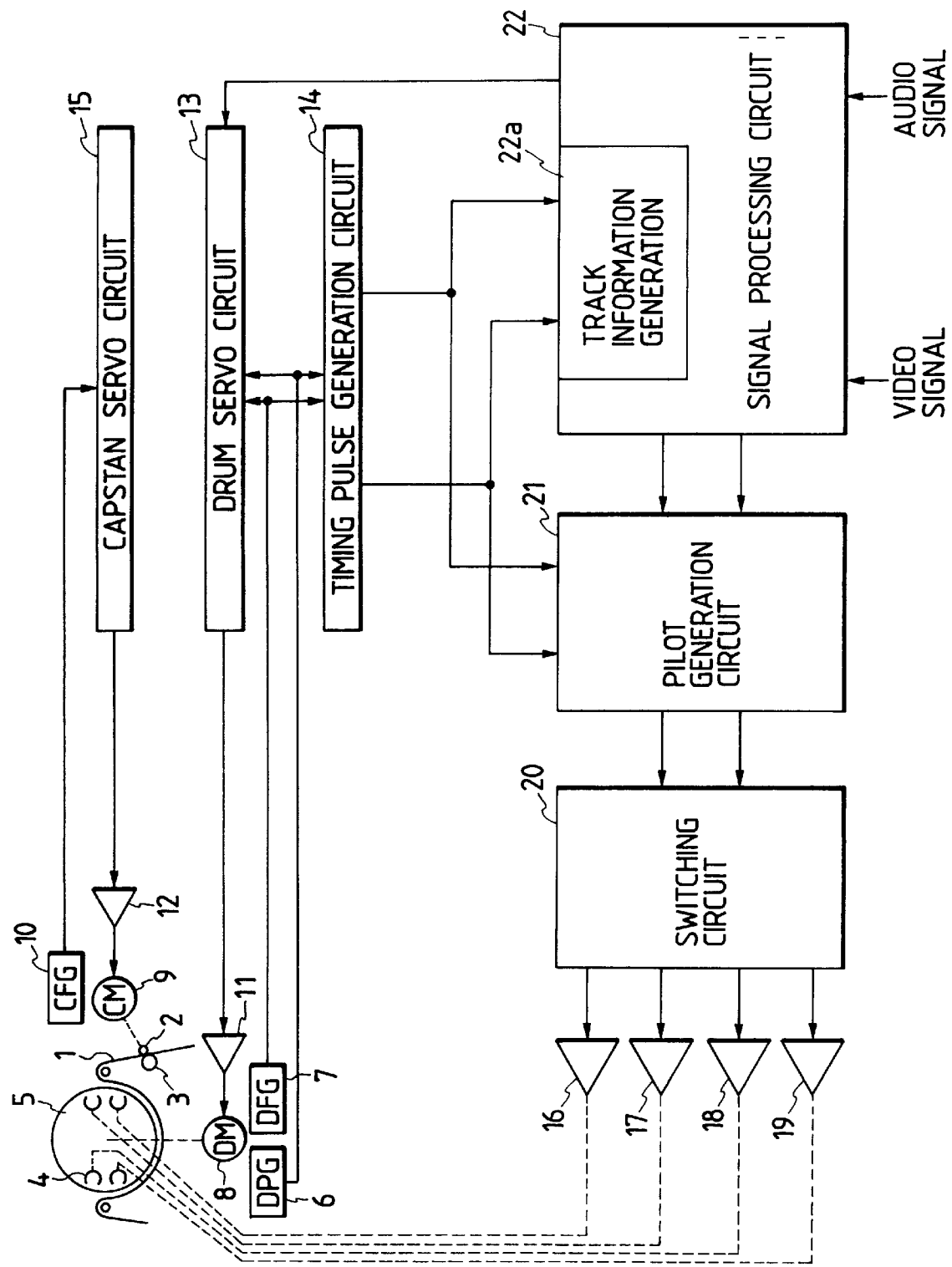
FIG. 15 is a block diagram showing the arrangement of a recording system of a VTR according to the fourth embodiment of the present invention.

FIG. 15 shows the arrangement of a recording system of a VTR according to the fourth embodiment of the present invention. This recording system has substantially the same arrangement as that shown in FIG. 1, except that the signal processing circuit 22 incorporates a track information generation device 22a for converting externally input video and audio signals into digital signals, executing processing such as predetermined compression, error correction, time-base processing, and the like, and generating information of intra-frame track numbers or a frame number associated with a pilot section on the basis of timings generated by the timing pulse generation circuit 14. Such information (to be simply referred to as track information hereinafter) is mixed in a bit stream consisting of video data, audio data, and the like, and is included in each of two systems of digital signals to be supplied to the pilot generation circuit 21.

Figure 16:
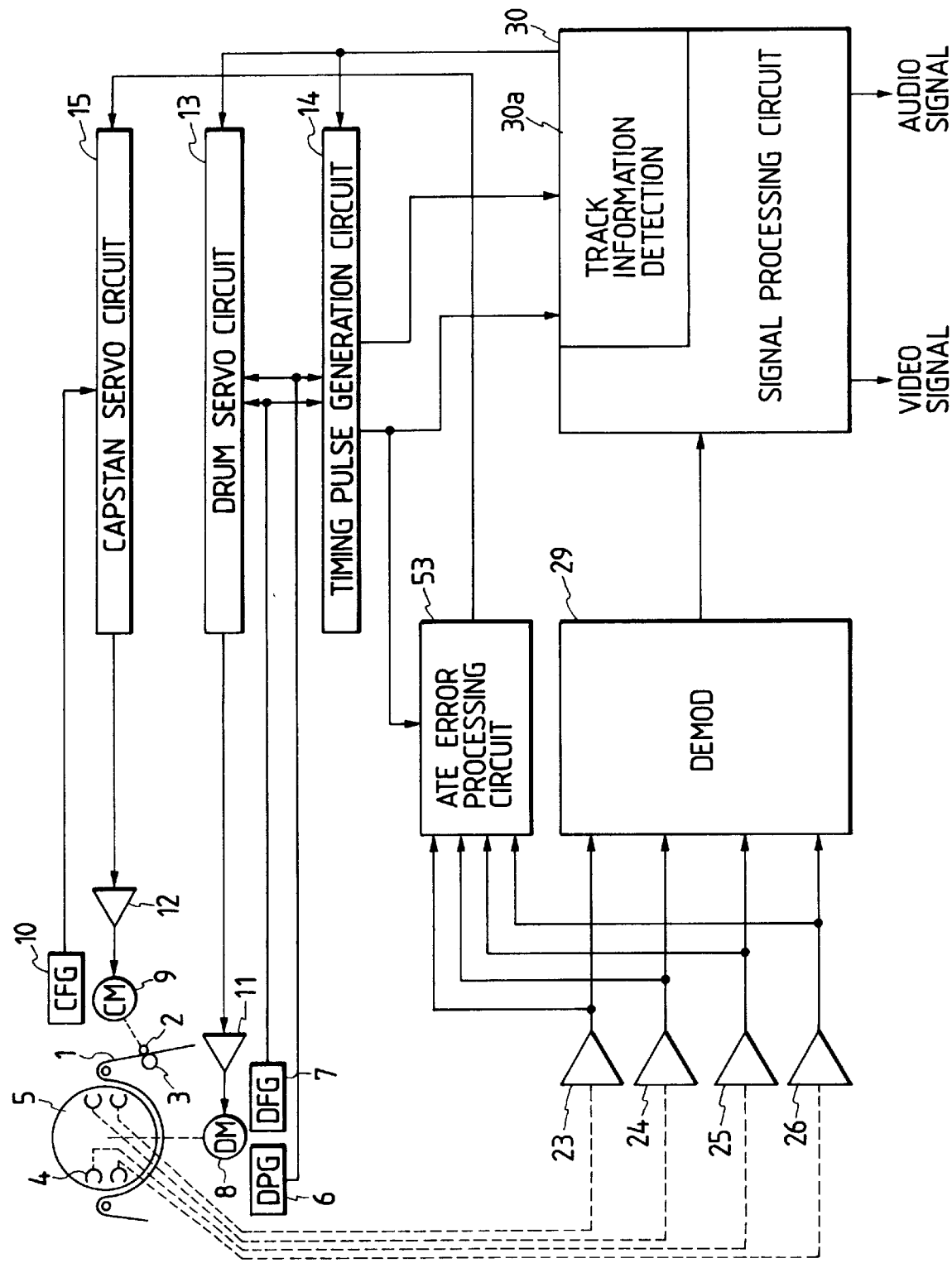
FIG. 16 is a block diagram showing the arrangement of a reproduction system of the VTR according to the fourth embodiment of the present invention.

FIG. 16 shows the arrangement of a reproduction system corresponding to the recording system shown in FIG. 15. In FIG. 16, components 1 to 15, 29, and 30 correspond to those in FIG. 9.

Referring to FIG. 16, the reproduction system includes an ATF error processing circuit 53 for outputting a signal corresponding to a tracking error amount to the capstan servo circuit 15 on the basis of a pilot signal for tracking included in a reproduction signal.

Note that the signal processing circuit 30 executes processing such as time-base processing, error correction, expansion, and the like, analog-converts the processed signal into original video and audio signals, and outputs the converted video and audio signals. In addition, the circuit 30 has a track information detection unit 30a for detecting information of track numbers in a reproduced frame or a frame number associated with a pilot section, and generates a pilot signal or a phase target of the drum at the beginning of a joint recording operation on the basis of the detected track information.

Figure 17:
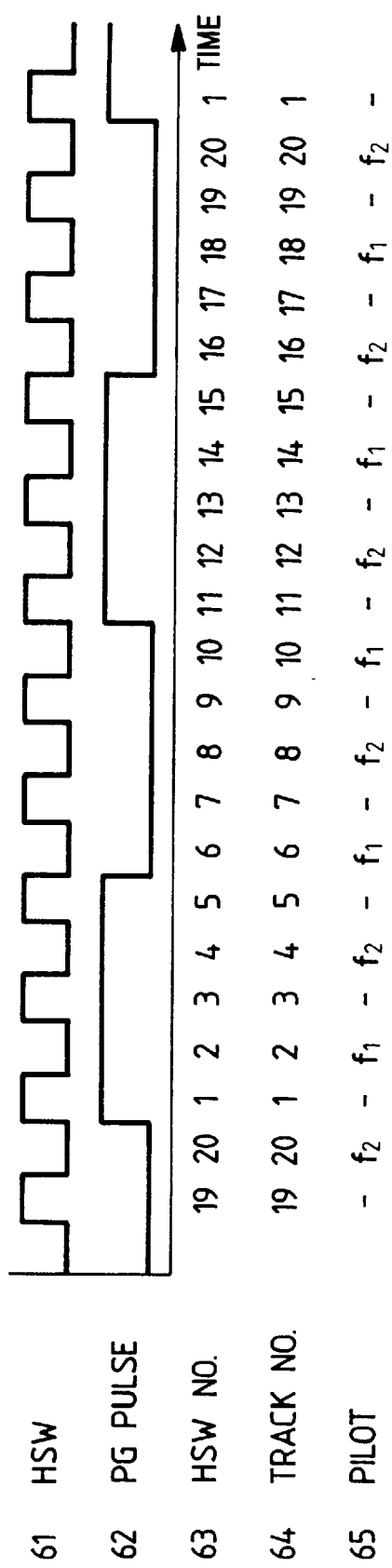
FIG. 17 is a timing chart for explaining an operation upon recording of the recording system of the VTR shown in FIG. 15.
Figure 18:
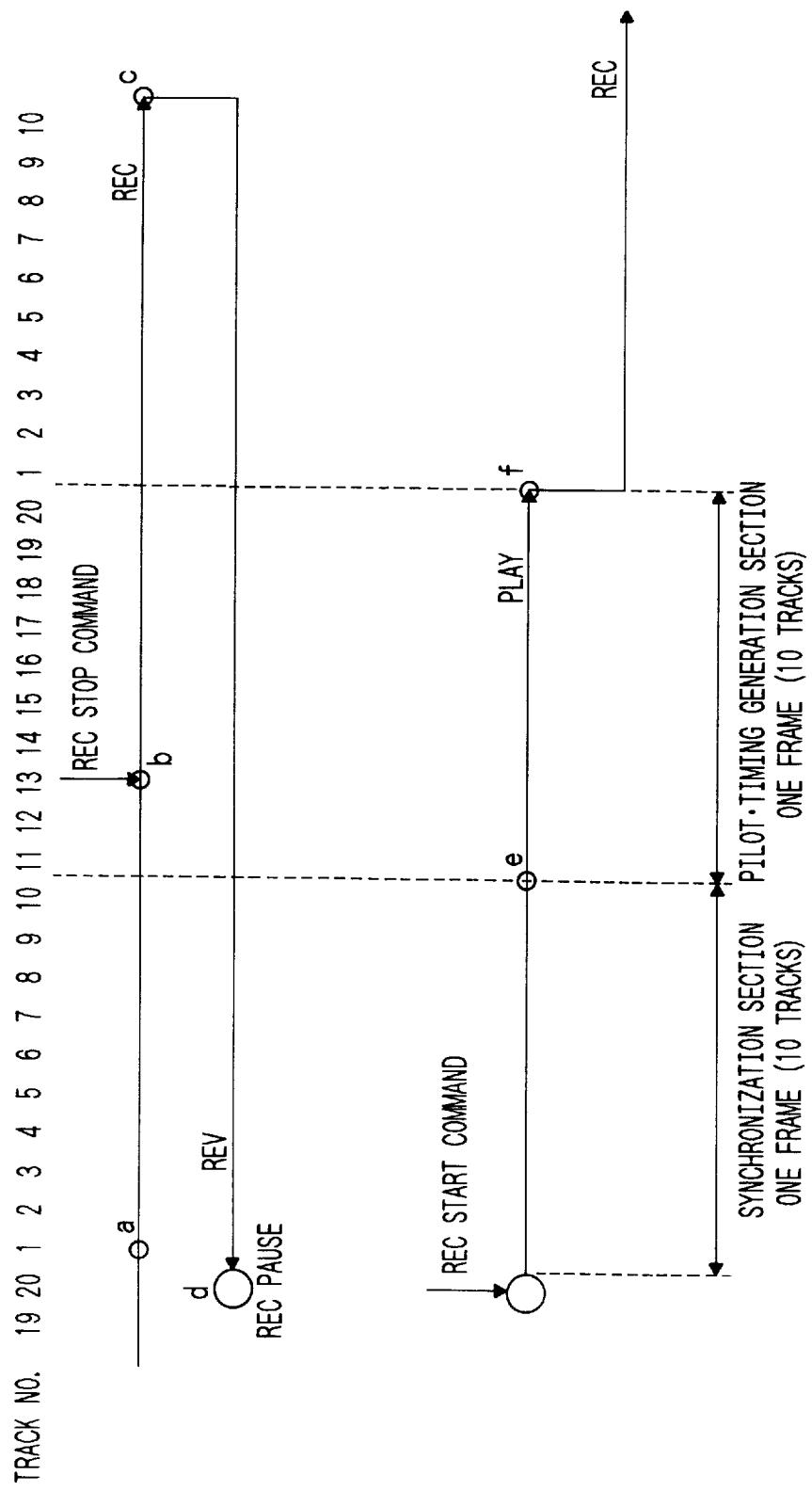
FIG. 18 is a mode transition chart for explaining operations upon execution of joint recording operations of the VTR shown in FIGS. 15 and 16.

FIGS. 17 and 18 are timing charts for explaining the operation of the VTR of this embodiment. FIG. 17 shows an operation in a recording mode, and FIG. 18 shows an operation in a joint recording mode.

Referring to FIG. 17, a waveform 61 represents HSW (head switching) pulses which are inverted in every section in which one pair of heads of the plurality of heads 4 operates (i.e., the pair of heads trace the tape), and a waveform 62 represents PG pulses which are inverted in every one-frame section of a video signal. In this embodiment, 5 cycles of HSW pulses define one section.

An HSW number 63 represents numbers assigned for every half section of the HSW pulse 61, i.e., every section in which one pair of heads trace the tape 1, a track number 64 represents numbers sequentially assigned to a plurality of tracks in a frame recorded on the tape 1, and a pilot signal 65 represents those superposed on main signals on each track.

FIG. 18 is a mode transition chart for explaining an operation in a joint recording mode in this embodiment.

An operation in the recording mode will be described below with reference to FIGS. 15 and 17.

Externally input video and audio signals are converted into digital signals by the signal processing circuit 22, and are subjected to processing such as predetermined compression, error correction, time-base processing, and the like. On the other hand, an Ref signal is generated based on a section signal of the video signal, and the drum servo circuit 13 performs rotation control of the drum on the basis of the Ref signal, a DPG signal of the PG sensor 6, and a DFG signal of the FG sensor 7.

The timing pulse generation circuit 14 generates various timing pulses synchronous with the rotation of the drum on the basis of the DPG signal and the DFG signal. These timing pulses include the HSW (head switching) pulse 61 and the PG pulse 62 in FIG. 17.

A combination of a signal subjected to various kinds of signal processing in the signal processing circuit 22 and track number data 64 generated based on the HSW pulse 61 and the PG pulse 62 (FIG. 17) by the track information generation unit 22a define a recording signal. The pilot signals 65 which are generated based on the HSW pulse 61 and the PG pulse 62 by the pilot generation circuit 21 are superposed on the recording signal, and the recording signal is then subjected to predetermined recording modulation. Thereafter, the recording signal is recorded on the tape 1 by the plurality of heads 4 via the recording amplifiers 16 to 19.

The operation in a reproduction mode will be described below with reference to FIG. 16.

Signals recorded on the tape 1 are reproduced by the plurality of heads 4, and are amplified by reproduction amplifiers 23 to 26 to obtain reproduction signals.

A pilot signal for tracking is extracted from one of the reproduction signals by the above-mentioned ATF error processing circuit 53, and is output to the capstan servo circuit 15 as a signal corresponding to a tracking error amount. The capstan servo circuit 15 performs rotation control of the capstan 2, i.e., speed control of the tape 1 on the basis of the tracking error signal, so that the heads 4 can trace tracks recorded on the tape 1.

The other one of the reproduction signals is demodulated by the demodulation circuit 29, and the demodulated signal is output to the signal processing circuit 30. The signal processing circuit 30 reads the track number data 64 using the track information detection unit 30a, executes processing such as time-base processing, error correction, expansion, and the like, analog-converts the processed signal into original video and audio signals, and outputs the converted video and audio signals to an external circuit.

The track number data 64 read from the reproduction signal by the signal processing circuit 30 is used in phase control of the rotation of the drum 5 in the drum servo circuit 13, and the timing pulse generation circuit 14 corrects the HSW pulse 61, the PG pulse 62, and the HSW number data 63 (FIG. 17) on the basis of the track number data 64. Thus, a target track of tracking control is shifted, and a stable tracking control state can be stably and quickly realized.

Figure 19:
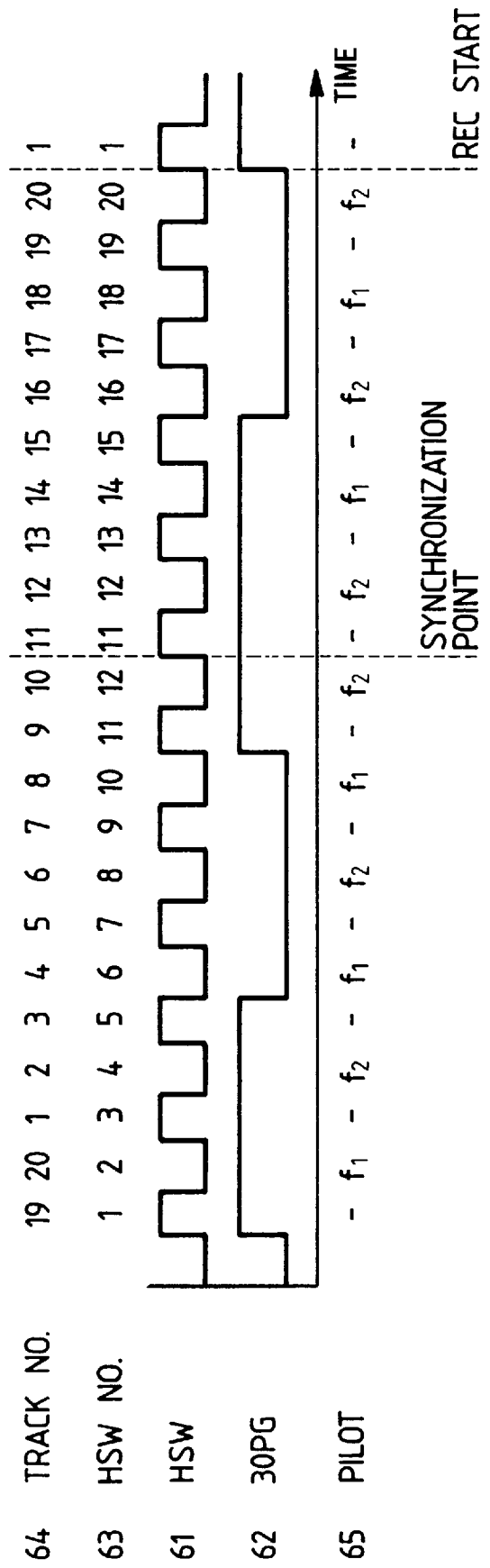
FIG. 19 is a timing chart for explaining operations upon execution of joint recording operations of the VTR shown in FIGS. 15 and 16.

The operation in the joint recording mode will be described below with reference to FIGS. 18 and 19.

Assume that information is recorded on a track of track number 1 at a point a. Also, assume that a recording stop command is issued at a point b during a Rec (recording) operation of a certain frame. Recording for one frame which is being recorded is continued, and is ended at a point c after another frame. Thereafter, a Rec Pause (recording temporary standby) state is set at a point d returned by three frames (30 tracks) in a Rev (reverse double-speed reproduction) mode.

In response to a Rec Start (recording start) command, preparation for achieving synchronization is performed while reproducing the recorded track number data in a Play (reproduction) mode. When a recording signal is played (reproduced) for one frame, and a point e corresponding to a switching point of frames is reached, the HSW number data 63, the PG pulse 62, and the pilot signal 65 are synchronized with the track number data 64 at a synchronization point, as shown in FIG. 19. Thereafter, another one frame is played (reproduced), and the Rec (recording) mode is started from a point f corresponding to a switching point of frames. More specifically, the last one frame corresponds to an overwriting portion for allowing smooth reproduction of the joint recording portion.

As described above, according to the fourth embodiment, a pilot signal at the beginning of the joint recording operation is generated on the basis of the reproduced track number data, thus smoothly achieving a satisfactory, stable joint recording operation within a short period of time. More specifically, when the HSW pulses are inverted in accordance with reproduced track number data, a control target track can be shifted.

In this embodiment, a joint recording operation is performed using a track number indicating the position of a track in each frame. Alternatively, a recording/reproduction apparatus which can record sub codes can generate a pilot signal at the beginning of the joint recording operation using the following sub codes.

Sub Codes:

intra-frame track No.

frame number associated with pilot section frame start track number frame end track number frame switching signal synchronization signal As described above, according to the first to third embodiments of the present invention, when pilot signals are switched between a pair of heads, which simultaneously or alternately record information, and are recorded on predetermined areas of a plurality of tracks recorded by a plurality of heads, reproduction pilot signals are obtained from main tracks by all the heads, and all the heads can obtain two neighboring pilot signals. Thus, all the heads can be set in a satisfactory tracking state.

According to the fourth embodiment, sub codes such as track information, frame information, and the like are recorded, and a pilot signal at the beginning of the joint recording operation is generated on the basis of the reproduced sub codes in the joint recording mode. Thus, the joint recording operation can be smoothly realized within a short period of time.

What is claimed is:

1. An information signal reproduction apparatus for reproducing an information signal from a recording medium on which a plurality of parallel tracks are formed, two pilot signals being alternately recorded, each of the two pilot signals being recorded on every fourth track, and track information being recorded on each track, the track information indicating positions of tracks among the plurality of tracks, said apparatus comprising:

reproduction means for reproducing signals by tracing the recording medium;

transport means for transporting the recording medium;

forming means for forming a tracking error signal by using the pilot signal in the signal reproduced by said reproducing means;

tracking control means for controlling a relative position between said reproduction means and the recording medium on the basis of the tracking error signal; and changing means for changing a target track to be traced by said reproduction means by a predetermined number of tracks on the basis of the track information reproduced by said reproduction means without providing an instruction to change the transporting speed at which said transport means transports the recording medium.

2. An apparatus according to claim 1, wherein the information signal is a digital signal, and the track information is recorded as a portion of the digital signal.

3. An apparatus according to claim 1, wherein the information signal comprises a video signal, and the track information indicates a position of tracks in one of a frame and a field of the video signal.

4. An apparatus according to claim 1, wherein the track information includes numerical value data which changes in every at least one track, and increases or monotonically decreases.

5. An information signal recording/reproduction apparatus comprising:

(a) superposing means for alternately superposing two pilot signals on an information signal;

(b) recording means for recording, together with the information signal on which the two pilot signals are superposed by said superposing means, a track information signal which indicates positions of tracks among a plurality of parallel tracks on a recording medium, each of the two pilot signals being recorded on every fourth track among the tracks;

(c) reproduction means for reproducing signals by tracing the recording medium;

(d) forming means for forming a tracking error signal on the basis of the pilot signals in the signals reproduced by said reproduction means; and (e) control means for controlling a selection operation of one of the two pilot signals to be superposed by said superposing means using the track information signal reproduced by said reproduction means.

6. An apparatus according to claim 5, wherein the information signal is a digital signal, and the track information is recorded as a portion of the digital signal.

7. An apparatus according to claim 5, wherein the information signal comprises a video signal, and the track information indicates a position of tracks in one of a frame and a field of the video signal.

8. An apparatus according to claim 5, wherein the track information includes numerical value data which changes in every at least one track, and monotonically increases or monotonically decreases.

* * * * *

UNITED STATES PATENT AND TRADEMARK OFFICE
CERTIFICATE OF CORRECTION

PATENT NO. : 5,875,065
DATED : February 23, 1999
INVENTOR(S) : YUKIO SHIMURA

It is certified that error appears in the above-identified patent and that said Letters Patent is hereby corrected as shown below:

```
COVER PAGE [54] TITLE,
"RECORDING" should read --RECORDING/--.
COLUMN 1,
Line 1, "RECORDING" should read --RECORDING/--.
COLUMN 2,
Line 14, "tracks" should read --track--.
COLUMN 3,
Line 39, "tracks" should read --track--.
COLUMN 5,
Line 6, "ones" should read --one--.
COLUMN 7,
Line 19, i" should read --is--; and
Line 57, "in." should read --in--.
COLUMN 8,
Line 61, "preformed" should read --performed--.
COLUMN 9,
Line 3, "preformed" should read --performed--.
```

Signed and Sealed this

Twenty-eighth Day of September, 1999

Attest:

Q. TODD DICKINSON

*Attesting Officer*    *Acting Commissioner of Patents and Trademarks*

UNITED STATES PATENT AND TRADEMARK OFFICE
CERTIFICATE OF CORRECTION

PATENT NO.    : 5,875,065
DATED         : February 23, 1999
INVENTOR(S)   : Yukio Shimura It is certified that error appears in the above-identified patent and that said Letters Patent is hereby corrected as shown below:

<u>Title page,</u>
Item [22] Filed: change "Aug. 10, 1996" to -- Sept. 10, 1996 --.

Signed and Sealed this

Tenth Day of September, 2002

Attest:

JAMES E. ROGAN
Attesting Officer      Director of the United States Patent and Trademark Office